(12) United States Patent
Agarwal et al.

(10) Patent No.: US 11,054,978 B2
(45) Date of Patent: *Jul. 6, 2021

(54) PORTABLE DEVICE AND METHOD FOR CONTROLLING BRIGHTNESS OF THE SAME

(71) Applicant: SAMSUNG ELECTRONICS CO., LTD., Suwon-si (KR)

(72) Inventors: Pankaj Agarwal, Suwon-si (KR); Ji-su Jung, Yongin-si (KR); Won-hee Choe, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,346

(22) Filed: Jan. 8, 2020

(65) Prior Publication Data

US 2020/0142578 A1  May 7, 2020

Related U.S. Application Data

(63) Continuation of application No. 15/083,426, filed on Mar. 29, 2016, now Pat. No. 10,552,019.

(Continued)

(30) Foreign Application Priority Data

Jun. 22, 2015  (KR) .................. 10-2015-0088536

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 1/3215* (2013.01); *G06F 1/3265* (2013.01);
(Continued)

(58) Field of Classification Search
CPC .. G09G 5/10; G09G 2370/16; G09G 2370/22; G09G 5/00; G09G 2320/0606;
(Continued)

(56) References Cited

U.S. PATENT DOCUMENTS

| | | |
|---|---|---|
| 8,890,793 B2 | 11/2014 | Wei et al. |
| 2003/0146897 A1 | 8/2003 | Hunter |

(Continued)

FOREIGN PATENT DOCUMENTS

| | | |
|---|---|---|
| CN | 101071542 A | 11/2007 |
| CN | 101866626 A | 10/2010 |

(Continued)

OTHER PUBLICATIONS

Communication dated Jul. 26, 2016 issued by the International Searching Authority in counterpart International Application No. PCT/KR2016/003966 (PCT/ISA/237).

(Continued)

*Primary Examiner* — Pei Yong Weng
(74) *Attorney, Agent, or Firm* — Sughrue Mion, PLLC

(57) ABSTRACT

A portable device and a method for controlling brightness thereof are provided. The portable device includes a display, a sensor and a controller. The display provides a display region that is displayed with a first brightness. The sensor senses a surrounding brightness of the portable device. The controller controls the display to display a partial region corresponding to a User Interaction (UI) element in the display region with a second brightness based on the sensed surrounding brightness.

20 Claims, 19 Drawing Sheets

Related U.S. Application Data

(60) Provisional application No. 62/148,364, filed on Apr. 16, 2015.

(51) Int. Cl.

| | | |
|---|---|---|
| *G06F 3/147* | (2006.01) | |
| *G09G 5/00* | (2006.01) | |
| *G06F 1/3215* | (2019.01) | |
| *G06F 3/0489* | (2013.01) | |
| *G06F 1/3234* | (2019.01) | |
| *G06F 3/0488* | (2013.01) | |
| *G09G 5/10* | (2006.01) | |

(52) U.S. Cl.
CPC ...... *G06F 3/04845* (2013.01); *G06F 3/04883* (2013.01); *G06F 3/04897* (2013.01); *G06F 3/147* (2013.01); *G09G 5/00* (2013.01); *G09G 5/10* (2013.01); *G06F 2203/04803* (2013.01); *G09G 2320/0606* (2013.01); *G09G 2320/0626* (2013.01); *G09G 2320/08* (2013.01); *G09G 2354/00* (2013.01); *G09G 2360/144* (2013.01); *G09G 2370/16* (2013.01); *G09G 2370/22* (2013.01); *Y02D 10/00* (2018.01)

(58) Field of Classification Search
CPC ....... G09G 2320/0626; G09G 2320/08; G09G 2354/00; G09G 2360/144; Y02D 10/00; G06F 3/04847; G06F 3/147; G06F 1/3215; G06F 3/04897; G06F 1/3265; G06F 2203/04803
See application file for complete search history.

(56) References Cited

U.S. PATENT DOCUMENTS

| | | | |
|---|---|---|---|
| 2006/0164442 A1 | 7/2006 | Furuhata | |
| 2006/0227125 A1 | 10/2006 | Wong et al. | |
| 2009/0007017 A1* | 1/2009 | Anzures | G06F 3/041 715/835 |
| 2010/0103186 A1* | 4/2010 | Luengen | G09G 5/10 345/589 |
| 2011/0234612 A1 | 9/2011 | Wei et al. | |
| 2011/0261087 A1 | 10/2011 | Bahk | |
| 2012/0280921 A1 | 11/2012 | Kwon | |
| 2013/0162611 A1 | 6/2013 | Lim et al. | |
| 2013/0328842 A1* | 12/2013 | Barnhoefer | G06F 3/0443 345/207 |
| 2014/0198137 A1 | 7/2014 | Feng et al. | |
| 2015/0084997 A1 | 3/2015 | Kim et al. | |
| 2016/0232856 A1 | 8/2016 | Hidaka et al. | |

FOREIGN PATENT DOCUMENTS

| | | |
|---|---|---|
| CN | 102768829 A | 11/2012 |
| CN | 104182040 A | 12/2014 |
| EP | 1884867 A1 | 2/2008 |
| EP | 3 032 525 A1 | 6/2016 |
| KR | 10-2009-0118431 A | 11/2009 |
| KR | 10-2012-0124202 A | 11/2012 |
| KR | 10-2013-0081975 A | 7/2013 |
| KR | 10-1359006 B1 | 2/2014 |
| WO | 2012150751 A1 | 11/2012 |
| WO | 2015/045752 A1 | 4/2015 |

OTHER PUBLICATIONS

Communication dated Feb. 9, 2018 issued by the European Patent Office in counterpart European Application No. 16780333.7.
Communication dated Apr. 5, 2019 issued by the European Intellectual Property Office in counterpart European Application No. 16 780 333.7.
Communication dated Jul. 26, 2016 issued by the International Searching Authority in counterpart International Application No. PCT/KR2016/003966 (PCT/ISA/210).
Communication dated May 20, 2020, from the State Intellectual Property Office of People's Republic of China in counterpart Application No. 201680034354.5.
Communication dated Sep. 16, 2020 by the Intellectual Property Office of India in counterpart Indian Patent Application No. 201717040931.
Communication dated May 25, 2021 issued by the European Patent Office in application No. 16780333.7.
Communication dated Mar. 3, 2021 issued by the Korean Patent Office in application No. 10-2015-0088536.

* cited by examiner (a) (b)

(a)  (b)

(a) (b)

PORTABLE DEVICE AND METHOD FOR CONTROLLING BRIGHTNESS OF THE SAME

CROSS-REFERENCE TO RELATED APPLICATIONS

This application is a Continuation of U.S. application Ser. No. 15/083,426, filed Mar. 29, 2016, which claims priority from Korean Patent Application No. 10-2015-0088536 filed on Jun. 22, 2015 in the Korean Intellectual Property Office, and U.S. Provisional Patent Application No. 62/148,364 filed on Apr. 16, 2015 in the United States Patent and Trademark Office, the entire contents of each of which are incorporated by reference herein in their entirety.

BACKGROUND

Field

Apparatuses, devices, articles of manufacture, and methods consistent with the present disclosure relate to a portable device and a method for controlling brightness of the portable device, and more particularly, to an apparatus and a method for controlling brightness of a portable device based on surrounding brightness.

Description of the Related Art

Due to development of electronic technology, various types of portable devices have developed and spread. In particular, portable devices provided with displays, such as smart phones, tablet PCs, and wearable devices, have been developed at high speed in the last several years.

Accordingly, the usage environment of the portable device has become diversified. For example, a user may use the portable device indoors or outdoors, and also in the daytime or at night.

In this case, as the user moves through different usage environments, the surrounding brightness of the portable device may differ, and due to this difference, the user may have a different perception of the brightness even when the user views the same content on the portable device. For example, if the user moves from a dark environment to a bright environment, the user may be unable to see the content displayed on the portable device well.

SUMMARY

Exemplary embodiments overcome the above disadvantages and other disadvantages not described above, and provide a portable device and/or method capable of adapting to a change of surrounding brightness of a portable device.

According to an aspect of an exemplary embodiment, there is provided a portable device that includes a display configured to provide a display region that is displayed with a first brightness; a sensor configured to sense a surrounding brightness of the portable device; and a controller configured to control the display to display a partial region corresponding to a User Interaction (UI) element in the display region with a second brightness based on the sensed surrounding brightness.

The controller may control the display to display a region excluding the partial region of the display region continuously with the first brightness, or with a third brightness that is lower than the second brightness.

The controller may control the display to display the partial region with the second brightness if an illuminance value corresponding to the sensed surrounding brightness is equal to or greater than a threshold value, or a changed value of the illuminance value is equal to or greater than a threshold value.

The partial region corresponding to the UI element may correspond to a layout region including the UI element, a field region including the UI element, or a plurality of pixels displaying the UI element.

The UI element may comprise a UI element for controlling the brightness of the display region.

The sensor may sense a user input for controlling the brightness of the display region through the UI element, and the controller may control the display to display the display region with a fourth brightness in response to the user input.

In the case where content is displayed in the display region, the UI element may comprise a UI element for controlling the content.

In the case where a lock screen is displayed in the display region, the UI element may comprise at least one UI element for releasing the lock screen.

The controller may identify the partial region corresponding to the UI element in the display region.

The first brightness may correspond to a first luminance value, and the second brightness may correspond to a second luminance value different from the first luminance value.

According to another aspect of an exemplary embodiment, there is provided a method for controlling brightness of a portable device, the method including displaying a display region with a first brightness; sensing a surrounding brightness of the portable device; and displaying a partial region corresponding to a User Interaction (UI) element in the display region with a second brightness based on the sensed surrounding brightness.

The displaying the partial region with the second brightness may comprise displaying a region excluding the partial region of the display region continuously with the first brightness, or with third brightness that is lower than the second brightness.

The displaying the partial region with the second brightness may comprise displaying the partial region with the second brightness if an illuminance value corresponding to the sensed surrounding brightness is equal to or greater than a threshold value, or a changed value of the illuminance value is equal to or greater than a threshold value.

The partial region corresponding to the UI element may correspond to a layout region including the UI element, a field region including the UI element, or a plurality of pixels displaying the UI element.

The UI element may comprise a UI element for controlling the brightness of the display region.

The method may further comprise sensing a user input for controlling the brightness of the display region through the UI element; and displaying the display region with a fourth brightness in response to the user input.

In the case where content is displayed in the display region, the UI element may comprise a UI element for controlling the content.

In the case where a lock screen is displayed in the display region, the UI element may comprise at least one UI element for releasing the lock screen.

The displaying the partial region with the second brightness may comprise identifying the partial region corresponding to the UI element in the display region, and displaying the partial region corresponding to the UI element with the second brightness.

According to another aspect of an exemplary embodiment, there is provided a non-transitory recording medium recorded with a program for controlling brightness of a portable device that performs displaying a display region of the portable device with a first brightness; and displaying a partial region corresponding to a User Interaction (UI) element in the display region with a second brightness based on surrounding brightness of the portable device.

According to another aspect of an exemplary embodiment, there is provided a portable device comprising a display; a sensor configured to sense an ambient brightness around the portable device; and a controller configured to control the display to display a partial region that is less than a whole display area of the display and that corresponds to a User Interaction (UI) element, with a brightness that differs from a brightness of a remaining region of the display when the ambient brightness changes.

The controller may control the display to display the partial region with a greater brightness than a remaining region of the display when the sensed ambient brightness increases, and to change the remaining region from a higher to a lower brightness while displaying the partial region with a brightness higher than the brightness of the remaining region when the sensed ambient brightness decreases.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1A:
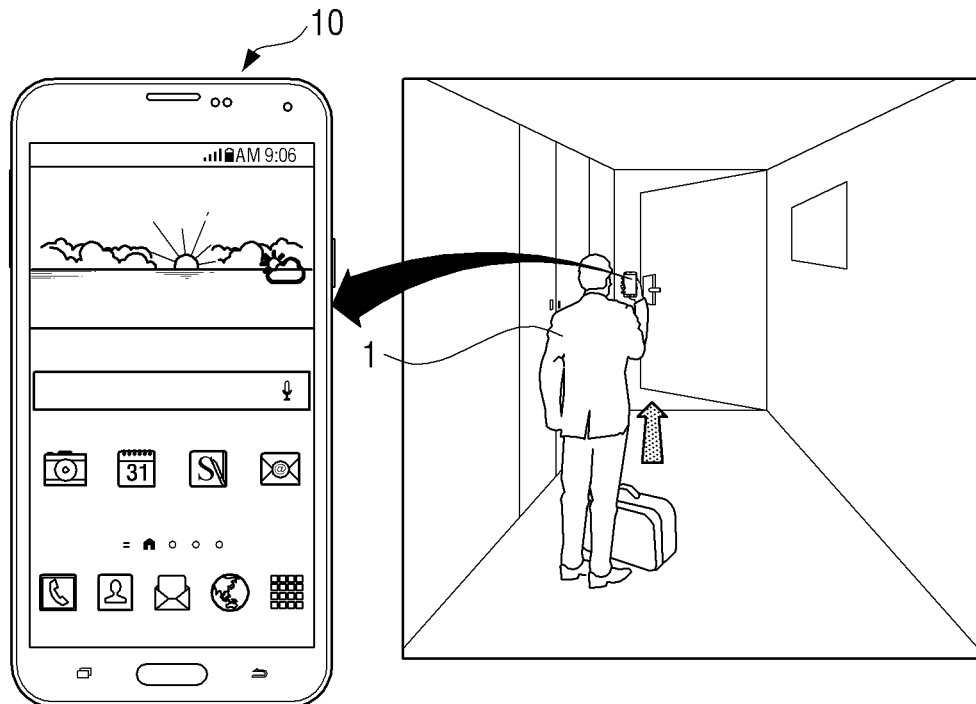
FIGS. 1A and 1B are views explaining situations in which the brightness of a portable device is controlled according to an exemplary embodiment.

Hereinafter, terms that are used in the description will be briefly described, and then exemplary embodiments will be described in detail.

In the present disclosure, all terms used in the description are general terms that are widely used in consideration of their functions in the present disclosure, but may differ depending on intentions of a person skilled in the art to which the present disclosure belongs, customs, or appearance of new technology. Further, in a specific case, an inventor may optionally select terms, and in this case, their meanings could be described in detail in the description of the present disclosure. Accordingly, they should be defined on the basis of the contents of the whole description of the present disclosure.

The present disclosure is not limited to the exemplary embodiments disclosed hereinafter, but can be implemented in various forms. The matters defined in the description, such as the detailed construction and elements, are nothing but specific details provided to assist those of ordinary skill in the art in a comprehensive understanding of the disclosure, and the present disclosure is only defined within the scope of the appended claims. In describing the present disclosure, well-known element structures and technologies are not described in detail since they would obscure the disclosure in unnecessary detail.

Although the terms "first", "second", and so forth are used to describe various elements, components and/or sections, such elements, components and/or sections are not limited by the terms. The terms are used only to discriminate an element, component, or section from other elements, components, or sections.

In the description, a singular expression may include a plural expression unless specially described. The term "includes" and/or "is composed of" used in the description means that one or more other features, figures, steps, operations, components, parts, and/or existence or addition of the elements are not excluded in addition to the described features, figures, steps, operations, components, parts, and/or existence of the elements.

In exemplary embodiments, the term "module" or "portion", as used herein, means, but is not limited to, a software or a hardware component or a combination thereof, which performs certain tasks. Further, "a plurality of modules or portions" may be integrally formed as at least one module and may be implemented by at least one processor (not illustrated) except for "modules" or "portions" that are required to be implemented by specific hardware.

In exemplary embodiments, the term "connected to" or "coupled to" that is used to designate a connection or coupling of one element to another element includes both a case that an element is "directly connected or coupled to" another element and a case that an element is electrically connected or coupled to another element via still another element. The term "includes" and/or "including" used in the description means that one or more other components, steps, operations and/or existence or addition of devices are not excluded in addition to the described components, steps, operations, and/or devices.

Hereinafter, exemplary embodiments will be described in detail with reference to the accompanying drawings. The aspects and features of the present disclosure and methods for achieving the aspects and features will be apparent by referring to the exemplary embodiments to be described in detail with reference to the accompanying drawings. However, the present disclosure may be implemented in various different forms, but is not limited to the exemplary embodiments described hereinafter. Further, in the drawings, portions that are not related to the description are omitted for clear explanation of the present disclosure, and in the entire description of the present disclosure, the same drawing reference numerals are used for the same elements even in different drawings.

In exemplary embodiments, a user input may include at least one of touch input, bending input, voice input, button input, motion input, and multimodal input, but is not limited thereto.

In exemplary embodiments, the term "touch input" may include a touch gesture that a user makes on a display or a cover to control the device. Further, the term "touch input" may include a touch (e.g., floating or hovering) that is in a state where the user does not come in contact with the display, but is spaced apart from the display over a predetermined distance. The touch input may be a touch & hold gesture, a tap gesture that makes a touch and then releases the touch, a double tap gesture, a panning gesture, a flick gesture, a touch drag gesture that makes a touch and then moves in one direction, or a pinch gesture, but is not limited thereto.

In exemplary embodiments, the term "button input" means an input that a user makes to control the device using physical buttons provided on the device.

In exemplary embodiments, the term "motion input" means a motion that a user applies to the device to control the device. For example, the term "motion input" may include an input that a user makes to rotate the device, to tilt the device, or to move the device in upper, lower, left, and right directions.

In exemplary embodiments, the term "multimodal input" means a combination of at least two input methods. For example, the device may receive the touch input and the motion input from the user, or may receive the touch input and the voice input from the user.

Further, in exemplary embodiments, the term "application" means a set of computer programs that are devised to perform specific tasks. In exemplary embodiments, various applications may be provided. For example, a game application, a moving image reproduction application, a map application, a memo application, a calendar application, a phone book application, a broadcasting application, an exercise support application, a settlement application, a photo folder application, a medical device control application, and a user interface providing application for a plurality of medical devices may be provided, but are not limited thereto.

Further, in exemplary embodiments, the term "application identification information" may be inherent information for discriminating an application from other applications. For example, the application identification information may be an icon, an index item, or link information, but is not limited thereto.

Further, in exemplary embodiments, the term "User Interaction (UI) element" means an element that can interact with a user to achieve feedback, such as visual, auditory, and olfactory feedback, in accordance with user inputs.

In an environment having a low surrounding brightness, a user does not feel any difficulty in seeing the screen of the portable device even if the portable device is set to have a low luminance value.

However, if the user moves to an environment having a high surrounding brightness in a state where the portable device is set to have a low luminance value, the user may feel difficulty in seeing the screen of the portable device due to the abrupt increase in the surrounding brightness of the portable device.

In this case, the user may intend to heighten the brightness of the portable device, but it may not be easy to search for a User Interaction (UI) element for controlling the brightness thereof. This difficulty may happen because it is difficult for the user to see the screen having a low luminance value when in an environment in which the surrounding brightness has increased. Further, even in the case where the user intends to control the content being reproduced, it may not be easy for the user to search for a UI element for controlling the content for similar reasons.

Figure 1B:
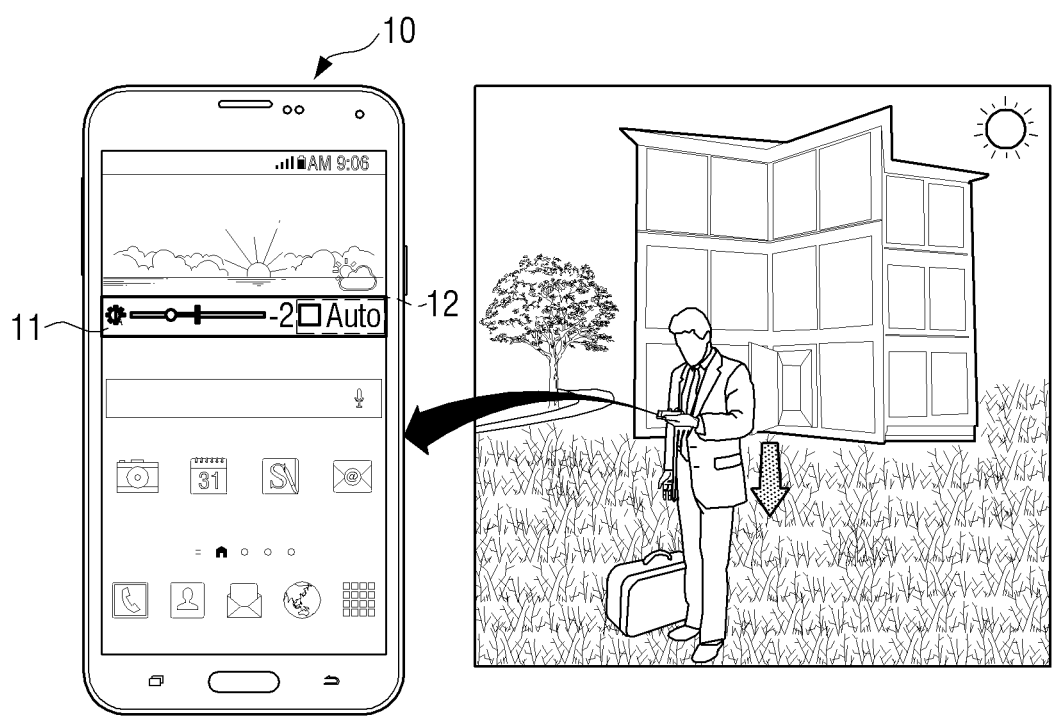

Exemplary embodiments seek to address these disadvantages, and provide a portable device and/or method capable of adapting to a change of surrounding brightness of a portable device FIGS. 1A and 1B are views explaining situations in which the brightness of a portable device 10 is controlled according to an exemplary embodiment.

Referring to FIG. 1, a portable device 10 may be implemented by devices for various purposes provided with displays. For example, the portable device 10 according to an exemplary embodiment may include a portable phone, a smart phone, a laptop computer, a tablet device, an electronic book device, a device for digital broadcasting, a Personal Digital Assistant (PDA), a Portable Multimedia Player (PMP), a navigation device, or a wearable device, such as a smart watch, smart glasses, or a Head-Mounted Display (HMD), but is not limited thereto.

As shown in FIG. 1A, a user 1 may use the portable device 10 at home. In this case, the portable device 10 may display a display region with a first brightness. In this situation, the user 1 may move from an inside of a house to an outside of the house.

As shown in FIG. 1B, the user who has moved to a bright outside of the house may feel difficulty in seeing the display region of the portable device 10. For example, if the quantity of the surrounding light is abruptly increased, the user may feel difficulty in seeing the display region until the size of the user's pupil is adjusted in accordance with the surrounding brightness.

In the case of sensing the surrounding brightness, the portable device 10 may determine whether an illuminance value that represents the surrounding brightness is equal to or greater than a threshold value. For example, if it is assumed that the illuminance value that can represent the surrounding brightness is in the range of ten levels, that is, in the range of level 1 to level 10, the portable device 10 may determine that the illuminance value is, for example, equal to or greater than level 7.

Based on the sensed surrounding brightness, the portable device 10 may control the display to display a partial region 11 corresponding to a User Interaction (UI) element in the display region with a second brightness.

Here, the partial region 11 corresponding to the UI element may include a layout region including the UI element, a field region including the UI element, or a plurality of pixels that display the UI element. On the other hand, the remaining region, which excludes the partial region corresponding to the UI element that is displayed with the second brightness, may be displayed continuously with the first brightness or with a brightness that is lower than the first brightness.

In this case, the luminance value corresponding to the second brightness may be greater than the luminance value corresponding to the first brightness. For example, if the luminance value corresponding to the first brightness is a value from about 10 lux to about 50 lux, the luminance value corresponding to the second brightness may be a value from about 100 lux to about 150 lux. Further, if the luminance value corresponding to the first brightness is a value from about 50 lux to about 100 lux, the luminance value corresponding to the second brightness may be a value from about 150 lux to about 200 lux. Further, if the luminance value corresponding to the first brightness is a value from about 100 lux to about 200 lux, the luminance value corresponding to the second brightness may be a value from about 300 lux to about 400 lux. On the other hand, the luminance value corresponding to the first brightness and the luminance value corresponding to the second brightness are not limited to the above-described examples, but may be set as various numerical values by a manufacturer of the portable device 10, a provider of an application installed in the portable device 10, or a provider of the operating system. Alternatively, the luminance values may be set experimentally according to use of the device, or by the user through, for example, a settings screen.

Further, the luminance value corresponding to the second brightness may relatively differ in accordance with the illuminance value of the surrounding brightness. For example, as the change of the illuminance value of the surrounding brightness becomes greater, the luminance value corresponding to the second brightness may become higher.

Further, the portable device 10 may operate in an auto brightness mode (e.g., in a state where an auto mode option 12 is checked; see FIG. 1B) in which the brightness of the display region is automatically changed in accordance with the surrounding brightness. In this case, the portable device 10 may determine the luminance value corresponding to the second brightness to be greater than the luminance value that is determined in accordance with the auto brightness mode. For example, if the brightness of the display region is changed from the first brightness to a third brightness in accordance with the auto brightness mode, the partial region 11 corresponding to the UI element may be displayed with a brightness that is brighter than the third brightness.

Referring again FIG. 1B, the UI element that is being displayed with the second brightness in the partial region 11 may be a UI element for controlling the brightness of the display region.

In this case, the user may control the brightness of the display region through the UI element. For example, the user may control the brightness of the display region of the portable device 10 to a fourth brightness that is brighter than the first brightness. In this case, the fourth brightness may be brighter than the first brightness.

Figure 2A:
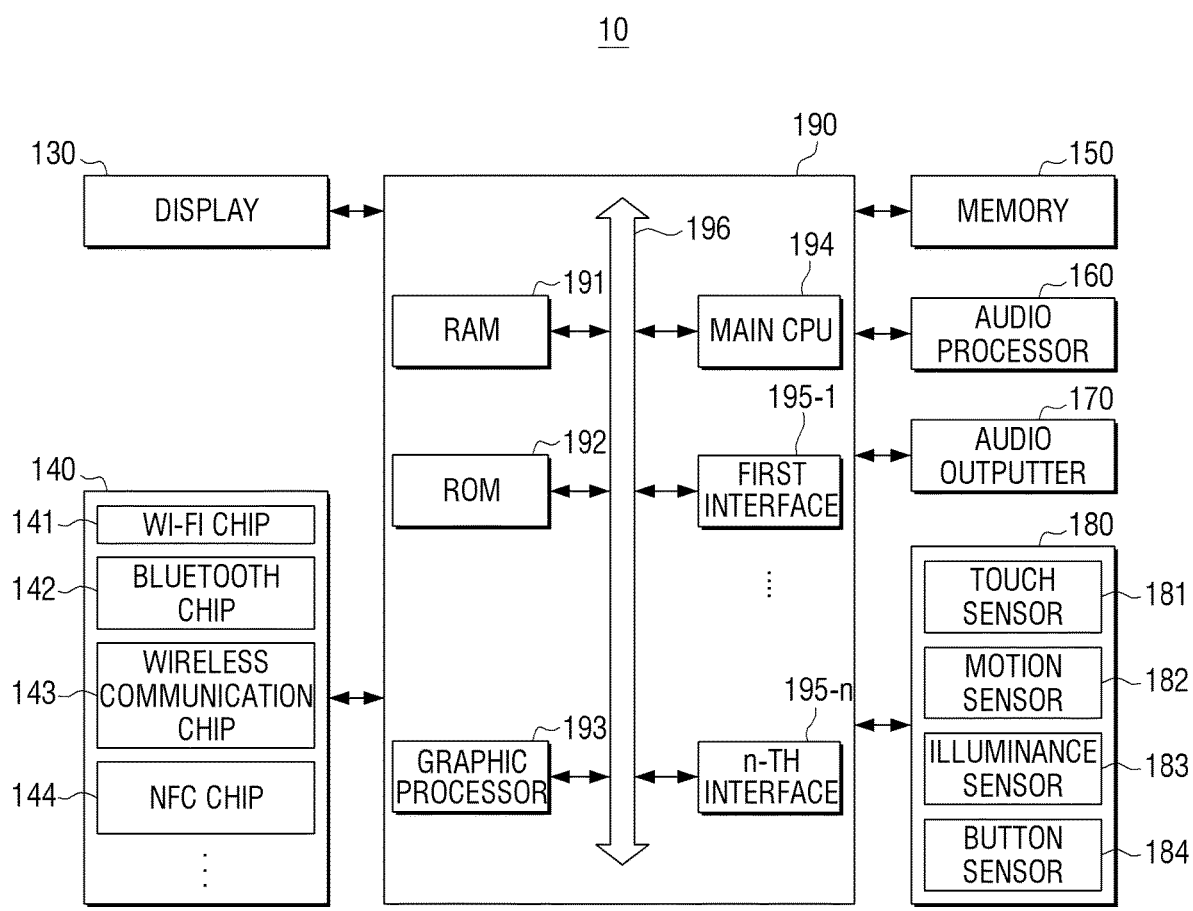
FIG. 2A is a block diagram schematically illustrating the configuration of a portable device according to an exemplary embodiment.

FIG. 2A is a block diagram schematically illustrating the configuration of a portable device according to an exemplary embodiment.

As illustrated in FIG. 2A, a portable device 10 may include at least one of a display 130, a communicator 140, a memory 150, an audio processor 160, an audio outputter 170, a sensor 180, and a controller 190. On the other hand, the configuration of the portable device 10 as illustrated in FIG. 2A is merely exemplary, and is not necessarily limited to the block diagram as described above. A part of the configuration of the portable device 10 illustrated in FIG. 2A may be omitted, modified, or added in accordance with the kind or purpose of the portable device 10.

The display 130 may display various screens on the display region. The various screens may be, for example, application execution screens. Various kinds of content (e.g., image, moving image, and/or text, etc.) and a UI element capable of controlling the content or portable device 10 may be displayed on the various screens.

The display 130 may have various sizes. For example, the display 130 may have a size of 3 inches, 4 inches, 4.65 inches, 5 inches, 6.5 inches, or 8.4 inches. The display 130 may be composed of a plurality of pixels. In this case, the numbers of the pixels in width and length may be expressed by resolution. For example, the display 130 may have 320×320 resolution, 360×480 resolution, 720×1280 resolution, 1280×800 resolution, or 3940×2160 resolution. However, the display sizes and the display resolutions are only examples, and are not intended to be limiting.

The display 130 may be implemented by various types of display panels. For example, the display panel may be implemented by various display technologies, such as Liquid Crystal Display (LCD), Organic Light Emitting Diode (OLED), Active-Matrix Organic Light-Emitting Diode (AM-OLED), Liquid Crystal on Silicon (LCoS), or Digital Light Processing (DLP).

The display 130 may be coupled to at least one of a front region, a side region, and a rear region of the portable device 10 in the form of a flexible display. The flexible display can be flexed, bended, or rolled without being damaged through a substrate that is thin and flexible like a paper. The flexible display may be manufactured using not only a glass substrate that is generally used but also a plastic substrate. In the case of using the plastic substrate, the flexible display may be formed using a low-temperature manufacturing processor other than the existing manufacturing processor to prevent the substrate from being damaged. Further, the flexible display may have flexibility so that it can be folded and unfolded through replacement of a glass substrate, which surrounds liquid crystals, with a plastic film. The flexible display has the advantages that it is thin, light, and strong against impacts, and can be manufactured in various shapes including flexible and bendable shapes.

The display 130 may be implemented by a touch screen of a layer structure through being combined with a touch sensor 181. The touch screen may have not only a display function but also a function of detecting a touch input location, a touched area, and even a touch input pressure. Further, the touch screen can detect not only an actual touch but also a proximity touch.

The communicator 140 is a configuration that performs communication with various types of external devices in accordance with various types of communication methods. The communicator 140 may include at least one of a Wi-Fi chip 141, a Bluetooth chip 142, a wireless communication chip 143, and an Near Field Communication (NFC) chip 144. The controller 190 may perform communication with an external server or various kinds of external devices using the communicator 140.

In particular, the Wi-Fi chip 141 and the Bluetooth chip 142 can perform communication in a Wi-Fi method and a Bluetooth method, respectively. In the case of using the Wi-Fi chip 141 or the Bluetooth chip 142, various kinds of connection information, such as a SSID and a session key, may be first transmitted and received to perform communication connection using the connection information, and then various kinds of information may be transmitted and received. The wireless communication chip 143 means a chip that performs communication in accordance with various communication standards, such as IEEE, Zigbee, $3^{rd}$ Generation (3G), $3^{rd}$ Generation Partnership Project (3GPP), and Long Term Evolution (LTE). The NFC chip 144 means a chip that operates in an NFC method using a frequency band of 13.56 MHz among various RF-ID frequency bands of 135 kHz, 13.56 MHz, 433 MHz, 860-960 MHz, and 2.45 GHz. However, these bands are only examples, and are not intended to be limiting.

The memory 150 may store various kinds of programs and data that are required to operate the portable device 10. The memory 150 may include a nonvolatile memory, a volatile memory, a flash memory, a Hard Disk Drive (HDD), or a Solid State Drive (SSD). The memory 150 may be accessed by the controller 190, and may perform data read/write/correction/delete/update through the controller 190. In the present disclosure, the term "memory" may include the memory 150, a ROM 192 and a RAM 191 in the controller 190, and/or a memory card (not illustrated) (e.g., micro SD card or memory stick) mounted in the portable device 10.

Further, programs and data for providing various kinds of screens to be displayed on the display region of the display 130 may be stored in the memory 150.

Hereinafter, referring to FIG. 2C, the structure of software that is stored in the memory 150 will be described. Referring to FIG. 2C, software that includes an Operating System (OS) 310, a kernel 320, middleware 330, and applications 340 may be stored in the memory 150.

The OS 310 controls and manages the whole operation of hardware. That is, the OS 310 is a layer that takes charge of basic functions, such as hardware management, memory, and secure.

The kernel 320 serves as a path for transferring various kinds of signals including touch signals sensed through the sensor 180 to the middleware 330.

The middleware 330 includes various kinds of software modules that control the operation of the portable device 10. Referring to FIG. 2C, the middleware 330 includes an X11 module 330-1, an APP manager 330-2, a connection manager 330-3, a secure module 330-4, a system manager 330-5, a multimedia framework 330-6, a main UI framework 330-7, a window manager 330-8, and/or a sub UI framework 330-9.

The X11 module 330-1 is a module that receives various kinds of event signals from various kinds of hardware configurations provided in the portable device 10. Here, the term "event" may be variously set as an event in which a user gesture is sensed, an event in which a system alarm is generated, or an event in which a specific program is executed or ended.

The APP manager 330-2 is a module that manages execution states of various kinds of applications 340 installed in the memory 150. If an application execution event is sensed by the X11 module 330-1, the APP manager 330-2 calls and executes an application that corresponds to the corresponding event.

The connection manager 330-3 is a module for supporting a wired or wireless network connection. The connection manager 330-3 may include various detailed modules, such as a DNET module and an UPnP module.

The secure module 330-4 is a module that supports hardware certification, request permission, and secure storage.

The system manager 330-5 monitors states of respective constituent elements in the portable device 10, and provides the results of monitoring to other modules. For example, in the case where a battery residual amount becomes insufficient, an error occurs, or a communication connection becomes disconnected, the system manager 330-5 may provide the results of monitoring to the main UI framework 330-7 or the sub UI framework 330-9 to output a notification message or notification sound.

The multimedia framework 330-6 is a module for reproducing multimedia content that is stored in the portable device 10 or is provided from an external source. The multimedia framework 330-6 may include a player module, a camcorder module, and a sound processing module. Accordingly, the multimedia framework 330-6 can reproduce various kinds of multimedia content to generate a screen and sound.

The main UI framework 330-7 is a module for providing various kinds of UIs to be displayed on a main region of the display 130, and the sub UI framework 330-9 is a module for providing various kinds of UIs to be displayed on a sub region. Each of the main UI framework 330-7 and the sub UI framework 330-9 may include an image compositor module that configures various kinds of UI elements, a coordinate compositor module that calculates coordinates at which the UI element is displayed, a rendering module that renders the configured UI element at the calculated coordinates, and a 2D/3D UI tool kit that provides a tool for configuring a 2D or 3D type UI.

The window manager 330-8 may sense a touch event using a user's body or a pen and other input events. If such an event is sensed, the window manager 330-8 transfers an event signal to the main UI framework 330-7 or the sub UI framework 330-9 to perform an operation that corresponds to the event.

In addition, various program modules, such as a handwriting module for drawing a line along a drag trace when a user touches and drags the screen and an angle calculation module for calculating a pitch angle, a roll angle, and a yaw angle based on sensor values sensed by the motion sensor 182, may be stored in the portable device 10.

The application module 340 includes applications 340-1 to 340-n for supporting various functions. For example, the application module 340 may include program modules for providing various services, such as a navigation program module, a game module, an electronic book module, a calendar module, and an alarm management module. Such applications may be installed by default or may be optionally installed by a user to be used in a usage process. If a UI element is selected, the main CPU 194 may execute an application that corresponds to the UI element selected using the application module 340.

The software structure illustrated in FIG. 2C is merely exemplary, and thus is not necessarily limited thereto. Accordingly, a part thereof may be omitted, modified, or added in accordance with the kind or purpose of the portable device 10. For example, various programs, such as a sensing module for analyzing signals sensed by various kinds of sensors, a messaging module including a messenger program, a text message program, and an e-mail program, a call information aggregator program module, a VoIP module, and a web browser module, may be additionally provided in the memory 150.

Referring again to FIG. 2A, the audio processor 160 is a constituent element that processes audio data of video content. The audio processor 160 may perform various processes, such as audio data decoding, amplification, and noise filtering. The audio data that is processed by the audio processor 160 may be output to the audio outputter 170.

The audio outputter 170 is a constituent element that outputs not only various kinds of audio data, of which various processes, such as decoding, amplification, and noise filtering, have been performed by the audio processor 160, but also various kinds of notification sound or voice messages. In particular, the audio outputter 170 may be implemented by a speaker. However, this is merely exemplary, and the audio outputter 170 may also be implemented by an output terminal that can output the audio data.

The sensor 180 senses various user inputs. Further, the sensor 180 may detect at least one of various changes, such as a posture change, an illuminance change, and an acceleration change, and transfer a corresponding electrical signal to the controller 390. That is, the sensor 180 may sense a state change that is made on the basis of the portable device 10, generate and transfer a corresponding sensing signal to the controller 190.

In the present disclosure, the sensor 180 may be composed of various sensors. When the potable device 10 is driven (or based on user's setting), a power is supplied to at least one sensor that is set under the control of the sensor 180, and thus the sensor can sense the state change of the portable device 10. In this case, the sensor 180 may be configured to include at least one of any type of sensing device that can detect the state changes of the portable device 10. For example, the sensor 180 may be configured to include at least one of various sensing devices, such as a touch sensor, an acceleration sensor, a gyro sensor, an illuminance sensor, a proximity sensor, a pressure sensor, a noise sensor (e.g., microphone), a video sensor (e.g., camera module), a pen sensor, and a timer. However, these sensors are only exemplary, and are not intended to be limiting.

The sensor 180 may be divided into a touch sensor 181, a motion sensor 182, an illuminance sensor 183, and a button sensor 184 in accordance with the purpose of sensing, but is not limited thereto. The sensor 180 may be divided in accordance with more various purposes.

Further, the sensors are not limited to any particular physical division, and at least one sensor may be combined to serve as the sensors 181, 182, 183, and 184. Further, depending on the implementation method, a part of the configuration or the function of the sensor 180 may be included in the controller 190.

The touch sensor 181 may sense user's finger touch input, and may output a touch event value that corresponds to the sensed touch signal. A touch panel of the touch sensor 181 may be mounted below the display 130. The touch sensor 181 may sense the user's finger touch input in capacitive and resistive touch sensing methods. The capacitive method is a method that calculates touch coordinates through sensing of fine electricity that is induced to the user's body. The resistive method is a method that calculates touch coordinates through sensing of current flow that is caused by contact of two electrode plates that are built in the touch panel at a touched point.

The touch sensor 81 may acquire output signals in accordance with the user's input from the touch sensor. The touch sensor 181 may calculate user input information, such as a touch location or touch coordinates, the number of touches, a cell ID, a touch angle, or a touched area, from the signal values, and may determine the kind of the touch input using the calculated user input information. In this case, the touch sensor 181 may determine the kind of the touch input using a touch recognition algorithm and touch pattern data stored in a memory (not illustrated) of the touch panel. Once the kind of the touch input is determined, the touch sensor 181 may transmit information about the kind of the touch input to the controller 190. As described above, the touch sensor 181 may sense a proximity touch location (or hovering location) input by the user.

In this case, the controller 190 may perform a part of the function of the touch sensor 181 as a substitute. For example, the touch sensor 181 may transmit the signal value acquired from the touch sensor or the user input information calculated from the signal value to the controller 190. The controller 190 may determine the kind of the touch input using the received signal value or the user input information, and the touch recognition algorithm and the touch pattern data stored in the memory 150. As an example, in the case where a phone application is executed, the controller 190 may detect that a call button of the phone application is selected from the user input information or the kind of the touch input, and transmit a call request to an opposite party through the communicator 140.

The motion sensor 182 may sense a motion (e.g., rotating motion or tilting motion) of the portable device 10 using at least one of an acceleration sensor, a tilt sensor, a gyro sensor, and a 3-axis magnetic sensor, and transfer a generated electrical signal to the controller 190. As an example, the motion sensor 182 measures an acceleration in which motion acceleration and gravity acceleration of the portable device 10 are added to each other, and if the portable device 10 has no motion, the motion sensor 182 may measure only the gravity acceleration.

For example, if it is assumed that the motion sensor 182 uses the acceleration sensor, the motion sensor 182 may measure the gravity acceleration with respect to X, Y, and Z axes based on the portable device 10. In this case, explanation will be made on the assumption that a direction in which the front surface of the portable device 10 is directed upward is a positive (+) direction of the gravity acceleration, and a direction in which the rear surface of the portable device 10 is directed upward is a negative (−) direction of the gravity acceleration. In the case where the rear surface of the portable device 10 is put on a horizontal surface, the gravity acceleration measured by the motion sensor 182 may have X and Y-axis components that are measured as 0 m/sec$^2$ and a Z-axis component that is measured as a specific positive value (e.g., +9.8 m/sec$^2$). In contrast, in the case where the front surface of the portable device 10 is put on the horizontal surface, the gravity acceleration measured by the motion sensor 182 may have X and Y-axis components that are measured as 0 m/sec$^2$ and a Z-axis component that is measured as a specific negative value (e.g., −9.8 m/sec$^2$). In addition, if it is assumed that the portable device 10 is slantingly put on the surface of a table, the gravity acceleration measured by the motion sensor 182 may have at least one axis component that is measured as a value that is not 0 m/sec$^2$ and the square root of the sum of squares of three-axis components, that is, the vector sum, may be the specific value (e.g., 9.8 m/sec$^2$). As described above, the motion sensor 182 may sense respective accelerations with respect to X, Y, and Z-axis directions in the coordinate system. On the other hand, In accordance with the sensor attachment location, the respective axes and the corresponding gravity accelerations may be changed.

The illuminance sensor 183 may sense the surrounding brightness of the portable device 10 using an illuminance sensing device. The illuminance sensor may sense the brightness using a photoelectric cell, and with respect to very low brightness, a photoelectric tube may be used. As an example of the illuminance sensor, a Cadmium Sulfide (CDS) illuminance sensor may be installed on both surfaces of the portable device 10 to sense the surrounding brightness of the portable device 10. The illuminance sensor 183 may convert a voltage that is acquired through the illuminance sensor into a digital value and transmit the digital value to the controller 190.

The sensor 180 may further include a pen sensor 184 (e.g., pen recognition panel) (not illustrated). The pen sensor may sense a user's pen input in accordance with the operation of a user's touch pen (e.g., stylus pen or digitizer pen), and output a pen proximity event value or a pen touch event value. The pen sensor may be implemented through, for example, an EMR method, and in this case, the touch or proximity input may be sensed in accordance with the intensity change of an electromagnetic field due to the pen proximity or pen touch. Specifically, the pen recognition panel may be configured to include an electromagnetic induction coil sensor having a grid structure and an electromagnetic signal processor sequentially providing an AC signal having a predetermined frequency to respective loop coils of the electromagnetic induction coil sensor. If a pen having a built-in resonant circuit is in the vicinity of the loop coil of the pen recognition panel, a magnetic field that is transmitted from the corresponding loop coil causes current based on the mutual electromagnetic induction to be generated in the resonant circuit of the pen. Based on this current, induced magnetic field is generated from the coil that constitutes the resonant circuit of the pen, and the pen recognition panel can detect the induced magnetic field from the loop coil that is in a signal reception state to sense the pen proximity location or the touch location.

The microphone (not illustrated) may receive user's voice for controlling a medical device (e.g., imaging startup, imaging stop, or imaging end) through the portable device 10, and recognize the user's voice through a voice recognition module. Further, the microphone may transmit the result of the recognition to the controller 190. In this case, the voice recognition module may be a part of the controller 190 other than the microphone, or may be located out of the portable device 10.

The controller (or processor) 190 may control the whole operation of the portable device 10 using various kinds of programs stored in the memory 150.

The controller 190 may include a RAM 191, a ROM 192, a graphic processor 193, a main CPU 194, first to n-th interfaces 195-1 to 195-$n$, and a bus 196. In this case, the RAM 191, the ROM 192, the graphic processor 193, the main CPU 194, and the first to n-th interfaces 195-1 to 195-$n$ may be connected to one another via the bus 196. The main CPU may include a plurality of CPUs.

The RAM 191 stores the OS and application programs. Specifically, if the portable device 10 is booted, the OS may be stored in the RAM 191, and various kinds of application data selected by the user may be stored in the RAM 191.

In the ROM 192, a set of commands for system booting is stored. If a turn-on command is input and the power is supplied, the main CPU 194 copies the OS stored in the memory 150 to the RAM 191 according to the command stored in the ROM 192 and executes the OS to boot the system. When the booting is completed, the main CPU 194 copies various kinds of application programs stored in the memory 150 to the RAM 191, and executes the application programs copied to the RAM 191 to perform various kinds of operations.

The graphic processor 193 generates a screen that includes various objects, such as items, images, and texts, using an operator (not illustrated) and a renderer (not illustrated). Here, the operator may be configured to operate attribute values, such as coordinate values, shapes, sizes, and colors of the objects to be displayed in accordance with the layout of the screen using a control command that is received from the sensor 180. The renderer may be configured to generate a screen of various layouts including the objects on the basis of the attribute values operated by the operator. The screen generated by the renderer may be displayed in the display region of the display 130.

The main CPU 194 accesses the memory 150 and performs booting using the OS stored in the memory 150. Further, the main CPU 194 performs various operations using various kinds of programs, content, and data stored in the memory 150.

The first to n-th interfaces 195-1 to 195-$n$ are connected to the various kinds of constituent elements as described above. One of the first to n-th interfaces 195-1 to 195-$n$ may become a network interface that is connected to an external device through a network.

The controller 190 may control the brightness of the display region based on the surrounding brightness of the portable device 10 that is sensed through the sensor 180.

Specifically, the controller 190 may determine an output luminance value corresponding to the brightness of the display region. For example, the controller 190 may determine the output luminance value of the display 130 using a mathematical time function, brightness values stored in a look up table (LUT), or values pre-recorded in a driver IC of the display 130. In this case, the output luminance value of the display 130 may be determined in consideration of an initial luminance value, a target luminance value, and/or the luminance change time.

The display 130 may include a lamp driver (not illustrated) that, in conjunction with the controller 190, may control the brightness of the display region in accordance with the determined luminance value. In this case, the controller 190 may determine a lamp supply voltage control value for controlling the lamp driver on the basis of the determined luminance value, and may control the lamp driver in accordance with the determined control value.

Specifically, the lamp driver may include a voltage control signal generator and a converter. The voltage control signal generator generates a voltage control signal corresponding to a lamp supply voltage control value that is received from the controller 190, and transmits the voltage control signal to the converter. The converter may control the output voltage of the lamp driver in accordance with the received voltage control signal. As described above, the lamp driver may control the brightness of the lamp in accordance with the lamp supply voltage control value received from the controller 190. In addition, in accordance with the implementation type of the display 130, the output luminance value of the display 130 may be controlled through various methods.

The lamp driver, in conjunction with the controller 190, may control the brightness of the display region in the unit of a pixel of the display, or in the unit of a region of the display that is a set of pixels. That is, the lamp driver, in conjunction with the controller 190, may control the brightness of individual pixels or a brightness of a region that comprises a plurality of pixels. For example, a voltage control signal generator, a converter, and a lamp may be provided for each pixel of the display or for each region of the display. In this case, the controller 190 may determine a plurality of lamp supply voltage control values for each pixel, or for each region of the display 130. The lamp driver may receive the lamp supply voltage control values for each pixel or for each region, and control the brightness of the lamp for each pixel or for each region in accordance with the received lamp supply voltage control values. Through this, the partial region of the display region may be displayed with the first brightness, and another partial region of the display region may be displayed with the second brightness.

Alternatively or additionally, the display 130, in conjunction with the controller 190, may control the brightness of the display region in the unit of a pixel, or in the unit of a region that is a set of pixels through upwardly adjusting RGB values of the pixels in accordance with the determined luminance value. For example, if RGB values of a specific pixel are 120, 100, and 50, respectively, the display 130, in conjunction with the controller 190, may apply a brightness scaler value to the specific pixel in accordance with the determined luminance value. For example, if the brightness scaler value is 1.5, the RGB values of the specific pixel may be 180, 150, and 75, respectively. The brightness scaler may be applied in the unit of a pixel, or in the unit of a region.

Further, the brightness scaler may be used together with the lamp driver to variously change the brightness range.

Figure 2B:
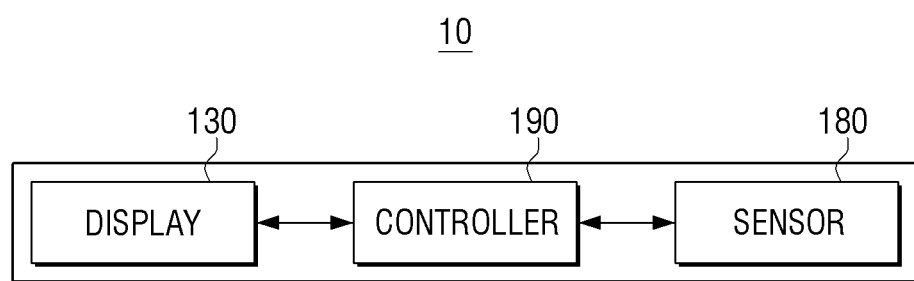
FIG. 2B is a block diagram schematically illustrating the configuration of a portable device according to another exemplary embodiment.
Figure 2C:
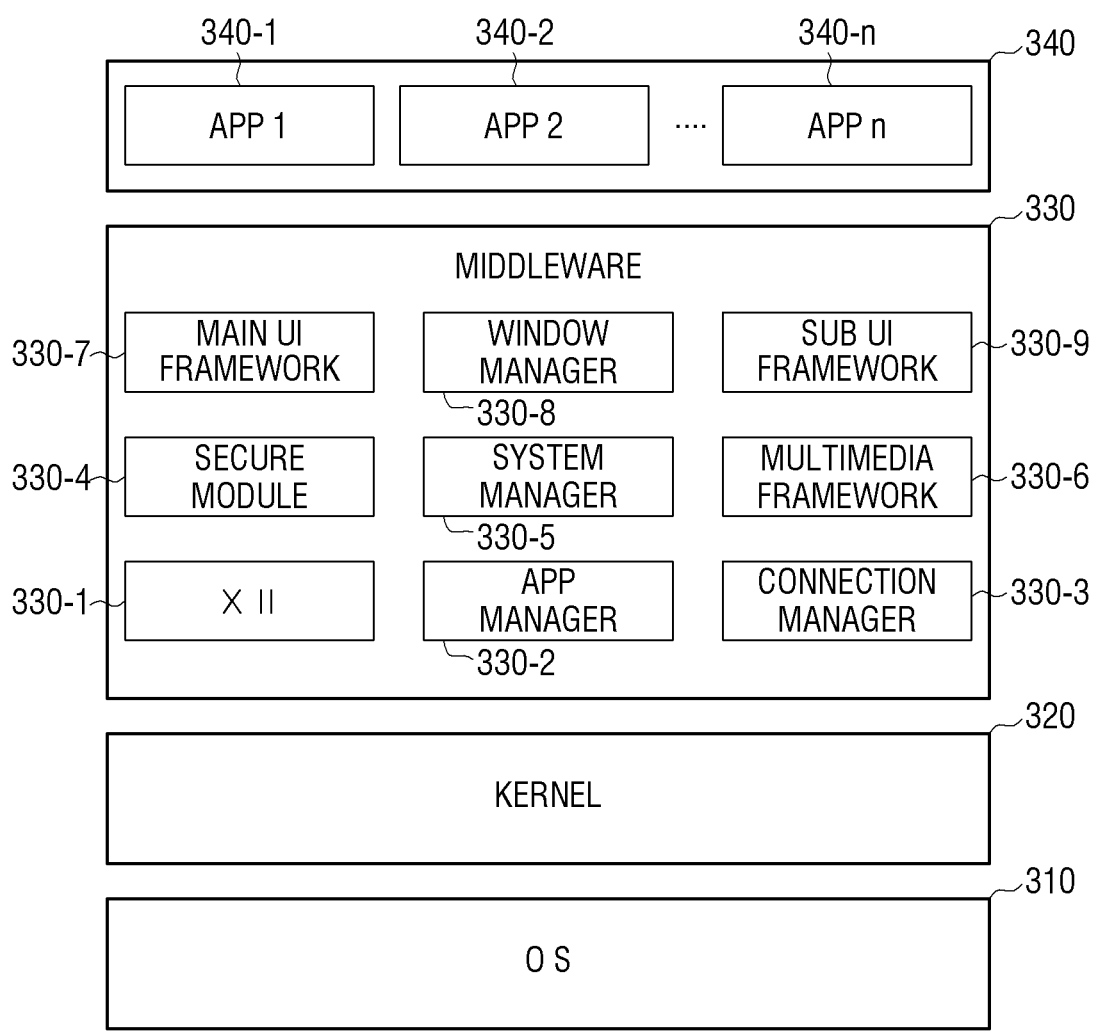
FIG. 2C is a diagram explaining the structure of software stored in a portable device according to an exemplary embodiment.

FIG. 2B is a block diagram schematically illustrating the configuration of a portable device according to another exemplary embodiment Referring to FIG. 2B, a portable device 10 may include a display 130, a sensor 180, and a controller 190.

The display 130 may provide a display region that is displayed with the first brightness. That is, the display region of the display 130 may be displayed with the first brightness that corresponds to a luminance value. The luminance value may be set by a manufacturer of the portable device 10, a provider of an application installed in the portable device 10, or a provider of the operating system. The luminance value may be set experimentally according to a use of the portable device 10. The luminance value may be designated by a user through a user interface.

The sensor 180 may sense the surrounding brightness of the portable device 10 using an illuminance sensor. Further, the sensor 180 may convert an acquired voltage into an illuminance value in accordance with the surrounding brightness and transmit the converted illuminance value to the controller 190.

The controller 190 may control the display 130 to display a partial region corresponding to a UI element in the display region with the second brightness based on the surrounding brightness. That is, the controller 190 may determine a luminance value corresponding to the second brightness based on the illuminance value that is received from the sensor 180, and transmit a voltage control signal corresponding to the determined luminance value to the display 130. The display 130 may display the region corresponding to the UI element in the display region in accordance with the received voltage control signal.

Figure 3:
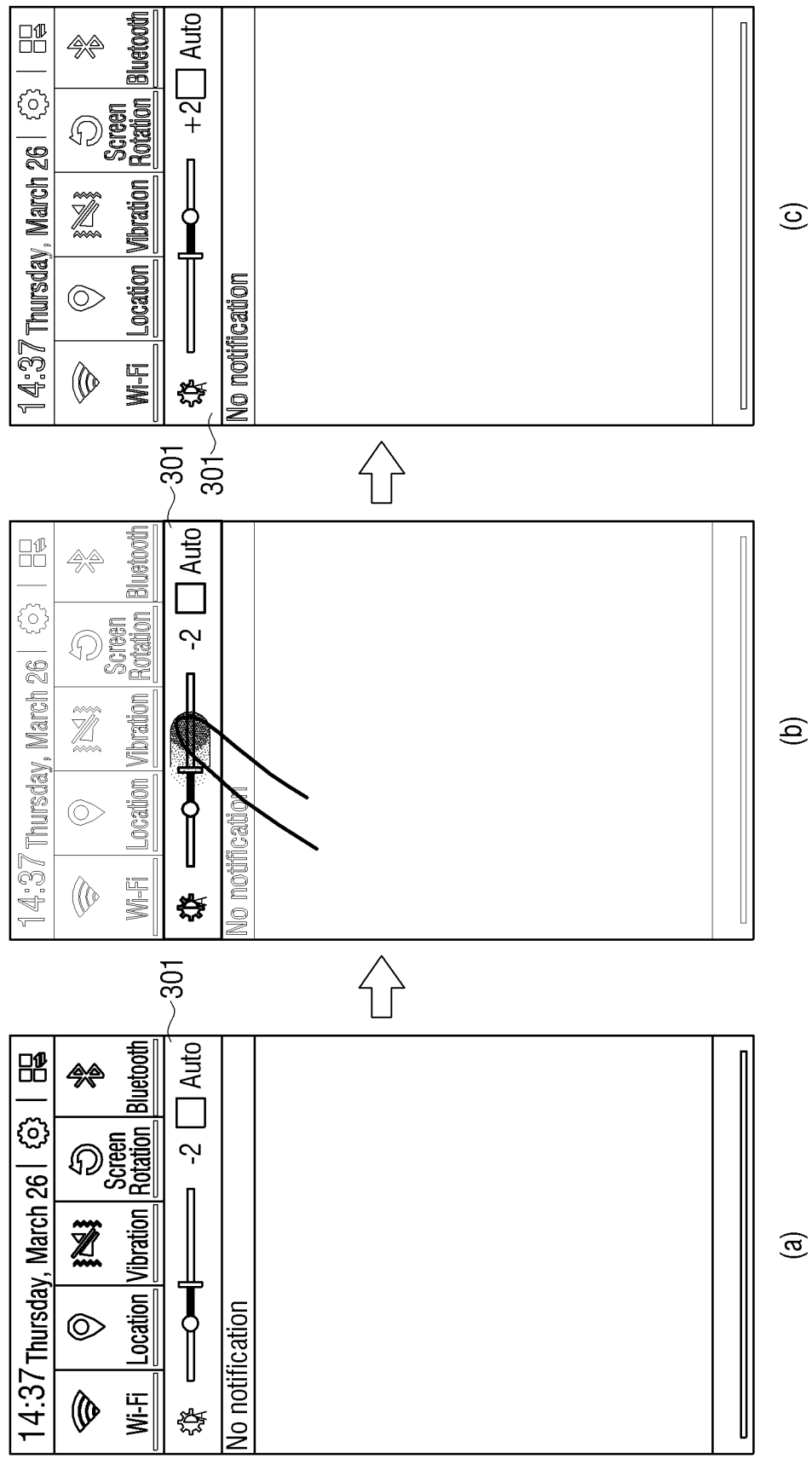
FIGS. 3 to 9 are views illustrating display regions of which a brightness is increased on the basis of a surrounding brightness according to an exemplary embodiment.

FIG. 3 is a view illustrating display regions of which the brightness is increased on the basis of surrounding brightness according to an exemplary embodiment. It should be noted that in the drawings, the drawings are not to scale as far as the lines of the drawings corresponding directly to the brightness of the various regions. Rather, the brightness of various lines and/or the correlation of the lines to the brightness may be exaggerated for clarity.

In FIG. 3, (a) shows a state where the whole display region is displayed with the first brightness.

In this state, the sensor 180 may sense the surrounding brightness of the portable device 10. For example, the sensor 180 may sense the surrounding brightness of the portable device 10 that is changed as a user moves from a dark place to a bright place. In this case, the user who has abruptly moved to a bright place may feel difficulty in seeing the display region of the portable device 10.

Accordingly, based on the sensed surrounding brightness, as shown as (b) of FIG. 3, the controller 190 may control the display 130 to display a region 301 corresponding to a brightness control UI element with the second brightness in the display region that is displayed with the first brightness.

Specifically, the controller 190 may determine the illuminance value that corresponds to the surrounding brightness. The controller 190 may determine whether the illuminance value that corresponds to the surrounding brightness of the portable device 100 is equal to or greater than a threshold value, or whether the changed value of the illuminance value is equal to or greater than a threshold value. For example, the portable device 10 may determine whether the illuminance value that corresponds to the surrounding brightness is equal to or greater than the threshold value (e.g., level 7). Alternatively or additionally, the portable device 10 may determine whether the changed value of the illuminance value is equal to or greater than the threshold value (e.g., level 2).

If it is determined that the illuminance value that corresponds to the surrounding brightness is equal to or greater than the threshold value, or that the changed value of the illuminance value is equal to or greater than the threshold value, the controller 190 may control the display 130 to display a region 301 that corresponds to a brightness control UI element with the second brightness. Further, the controller 190 may control the display 130 to display a region that excludes the above-described region 301 continuously with the first brightness. It should be noted that in (b) the region that excludes the region 301 is shown greyed out in order to clearly illustrate the brightness difference between the region 310 and the region that excludes the region 301. In actual implementation, the brightness of the region that excludes the region 301 is the first brightness as described above.

Alternatively, in order for the brightness control UI element to be seen well, the controller 190 may control the display 130 to display the region that excludes the region 301 corresponding to the brightness control UI element with a brightness that is lower than the first brightness.

Next, as shown as (b) of FIG. 3, the sensor 180 may receive a user input for controlling the brightness of the display region through the brightness control UI element. The user input may be, for example, a touch input to touch and drag an adjuster of the brightness control UI element.

In response to the user input, as shown as (c) of FIG. 3, the controller 190 may control the display 130 to display the display region with third brightness that is greater than the first brightness. Specifically, the controller 190 may determine the luminance value in accordance with the user input, and determine a lamp supply voltage value for controlling a lamp driver based on the determined luminance value. Further, the controller 190 may transmit the lamp supply voltage control value to the display 130 and control the display 130 to be displayed with the third brightness that corresponds to the determined luminance value.

Figure 4:
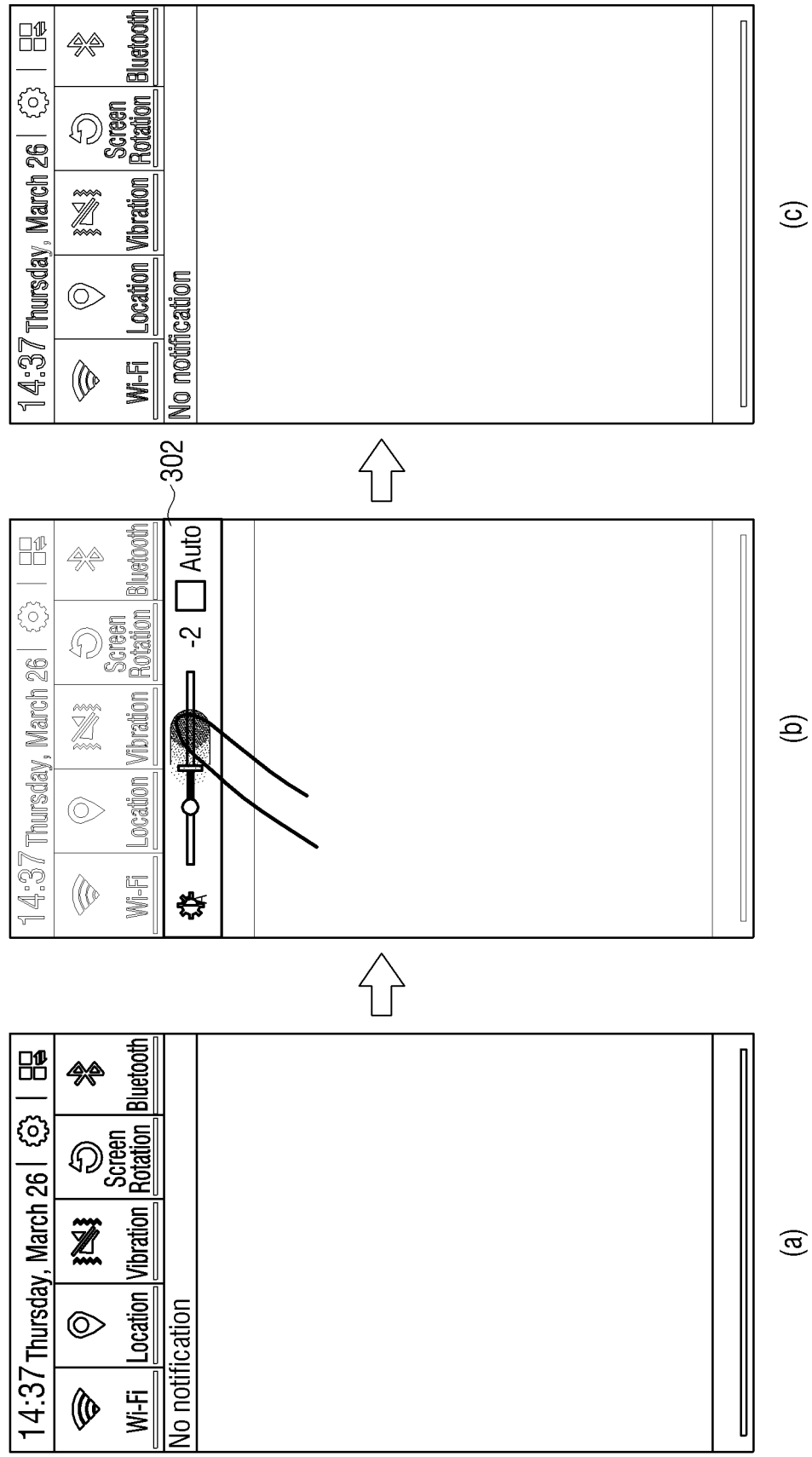

FIG. 4 is a view illustrating display regions of which the brightness is increased on the basis of surrounding brightness according to another exemplary embodiment.

In FIG. 4, (a) shows a state where the whole display region is displayed with the first brightness.

In this state, the sensor 180 may sense the surrounding brightness of the portable device 10. For example, the sensor 180 may sense the surrounding brightness of the portable device 10 that is changed as a user moves from a dark place to a bright place.

Based on the sensed surrounding brightness, as shown as (b) of FIG. 4, the controller 190 may control the display 130 to newly display a brightness control UI element on the display region and to display a region 302 corresponding to the brightness control UI element with the second brightness. That is, if the illuminance value that corresponds to the surrounding brightness is equal to or greater than a threshold value, or the changed value of the illuminance value is equal to or greater than a threshold value, the controller 190 may control the display 130 to newly display the brightness control UI element on the display region.

In this case, the controller 190 may control the display 130 to display a region that excludes the above-described region 302 corresponding to the brightness control UI element continuously with the first brightness or with a brightness that is lower than the first brightness.

Next, the sensor 180 may receive a user input for controlling the brightness of the display region through the brightness control UI element.

In response to the user input, as shown as (c) of FIG. 4, the controller 190 may control the display 130 to display the display region with third brightness that is greater than the first brightness. In this case, the user's touch drag is released, and thus the controller 190 may control the display 130 to make the brightness control UI element automatically disappear from the display region.

Figure 5:
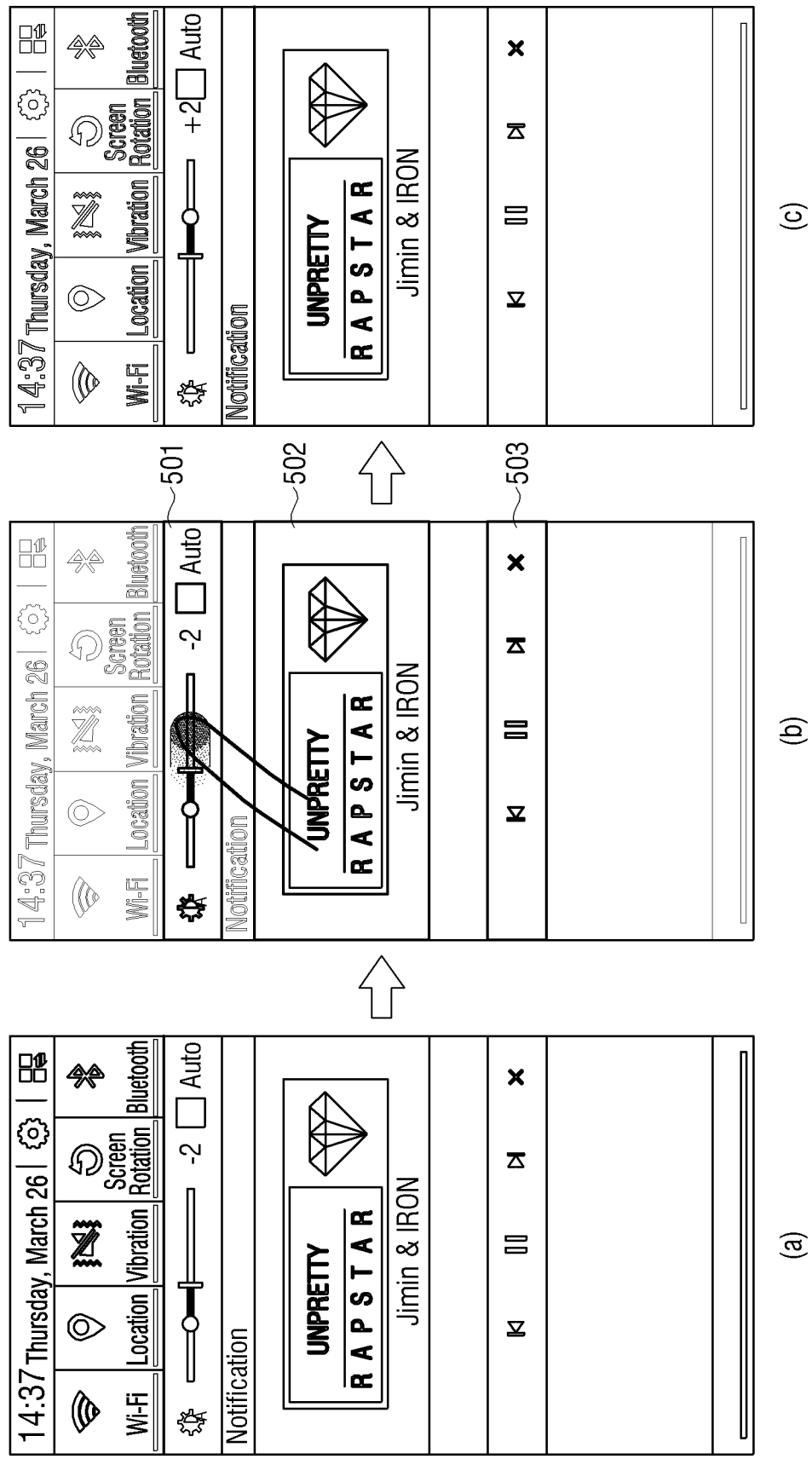

FIG. 5 is a view illustrating display regions of which the brightness is increased on the basis of surrounding brightness according to still another exemplary embodiment.

In FIG. 5, (a) shows a state where the whole display region is displayed with the first brightness. In this case, a content reproduction screen for reproducing content may be displayed on the display region. The content reproduction screen may include content identification information and a content control UI element.

In this state, the sensor 180 may sense the surrounding brightness of the portable device 10.

Based on the sensed surrounding brightness, as shown as (b) of FIG. 5, the controller 190 may control the display 130 to display regions 501, 502, and 503 corresponding to a plurality of user interfaces with the second brightness in the display region. For example, the controller 190 may control the display 130 to display the region 501 corresponding to a brightness control UI element and the region 503 corresponding to a content control UI element with the second brightness.

In this case, the brightness control UI element may be set by a provider of an application installed in the portable device 10 or a provider of the operating system. Further, the brightness control UI element may be pre-designated by a user. Further, the brightness control UI element may be determined through context awareness technology of the portable device 10. For example, based on the sensed surrounding brightness, the controller 190 may identify the UI element in the display region. That is, the controller 190 may identify the content control UI element on the content reproduction screen.

Again, as shown as (b) of FIG. 5, the controller 190 may control the display 130 to display a region 502 corresponding to content identification information with the second brightness.

Next, the controller 190 may receive a user input for controlling the brightness of the display region through the brightness control UI element. The user input may be, for example, a touch input to touch and drag an adjuster of the brightness control UI element.

In response to the user input, as shown as (c) of FIG. 5, the controller 190 may control the display 130 to display the display region with third brightness that is greater than the first brightness.

Figure 6:
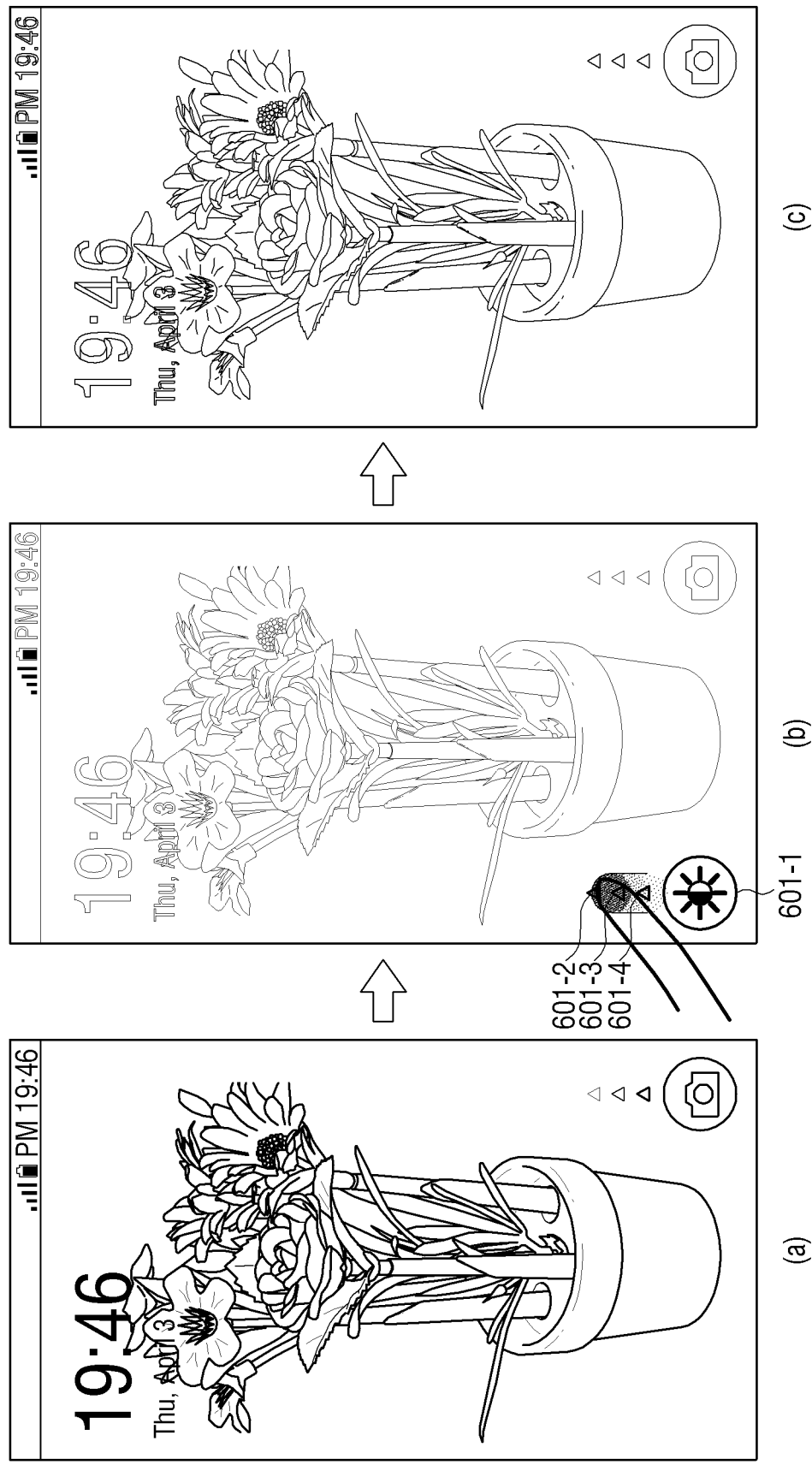

FIG. 6 is a view illustrating display regions of which the brightness is increased on the basis of surrounding brightness according to still another exemplary embodiment.

In FIG. 6, (a) shows a state where the whole display region is displayed with the first brightness. In this state, a lock screen may be displayed on the display region. The lock screen may be a screen that is displayed before entering into a home screen in the case where a user presses one side of the portable device 10 or a home button in a state where the display region is turned off or in a black screen state.

In this situation, the sensor 180 may sense the surrounding brightness of the portable device 10.

Based on the sensed surrounding brightness, as shown as (b) of FIG. 6, the controller 190 may control the display 130 to newly display a brightness control UI element on the lock screen and to display pixels 601-1 to 601-4 corresponding to the brightness control UI element with the second brightness. Next, the sensor 180 may receive a user input for controlling the brightness of the lock screen. The user input may be a touch input that selects an adjuster 601-1 of the brightness control UI element and vertically touches and drags the adjuster.

In response to the user input, as shown as (c) of FIG. 6, the controller 190 may control the display 130 to display the lock screen with third brightness that is greater than the first brightness. In this case, since the user's touch drag is released, the controller 190 may control the display 130 to make the brightness control UI element automatically disappear from the lock screen.

Figure 7:
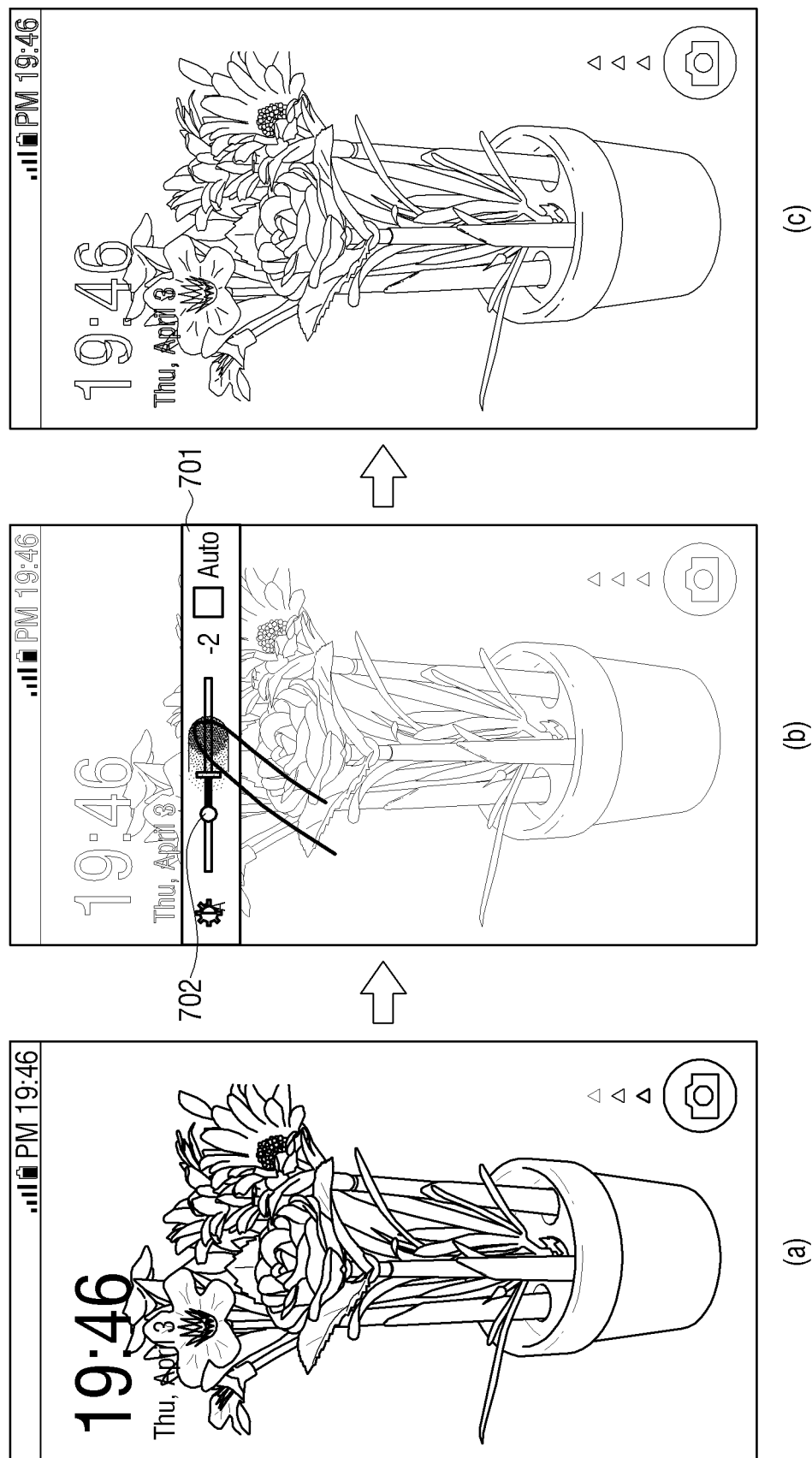

FIG. 7 is a view illustrating display regions of which the brightness is increased on the basis of surrounding brightness according to still another exemplary embodiment.

In FIG. 7, (a) shows a state where the whole display region is displayed with the first brightness. In this state, a lock screen may be displayed on the display region.

In this situation, the sensor 180 may sense the surrounding brightness of the portable device 10.

Based on the sensed surrounding brightness, as shown as (b) of FIG. 7, the controller 190 may control the display 130 to newly display a brightness control UI element on the lock screen and to display a region 701 corresponding to the brightness control UI element with the second brightness. Next, the sensor 180 may receive a user input for controlling the brightness of the lock screen. The user input may be a touch input that selects an adjuster 702 of the brightness control UI element and horizontally touches and drags the adjuster.

In response to the user input, as shown as (c) of FIG. 7, the controller 190 may control the display 130 to display the lock screen with third brightness that is greater than the first brightness.

Figure 8:
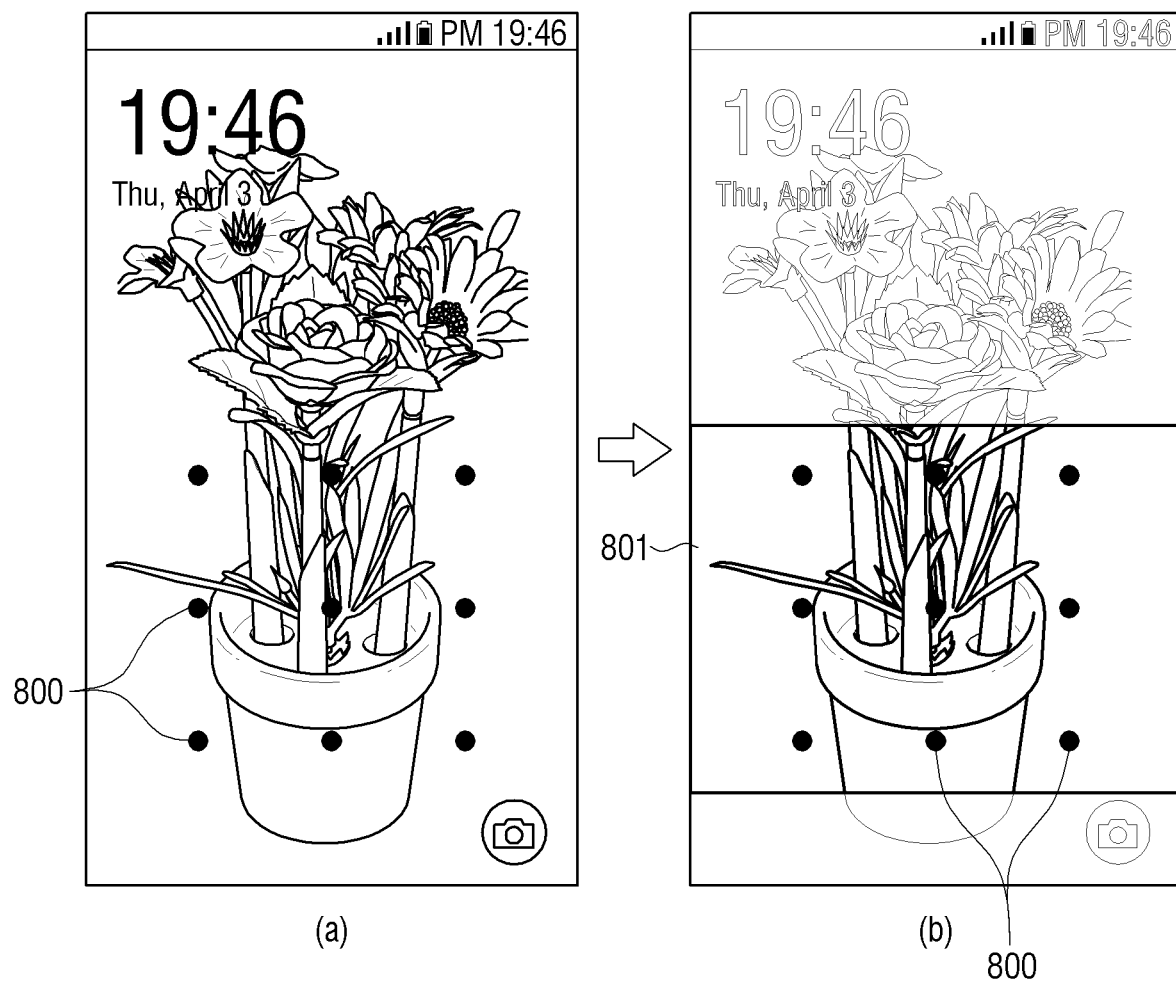

FIG. 8 is a view illustrating display regions of which the brightness is increased on the basis of surrounding brightness according to still another exemplary embodiment.

In FIG. 8, (a) shows a state where the whole display region is displayed with the first brightness. In this state, a lock screen including UI elements 800 for receiving an input of a pattern may be displayed on the display region.

In this situation, the sensor 180 may sense the surrounding brightness of the portable device 10.

Based on the sensed surrounding brightness, as shown as (b) of FIG. 8, the controller 190 may control the display 130 to display a region 801 that includes UI elements 800 that are used to release the lock screen with the second brightness.

Next, the sensor 180 may receive a user's pattern input on the region 801 that includes the UI elements 800. In response to the user input, the controller 190 may control the display 130 to release the lock screen and to display a home screen.

Figure 9:
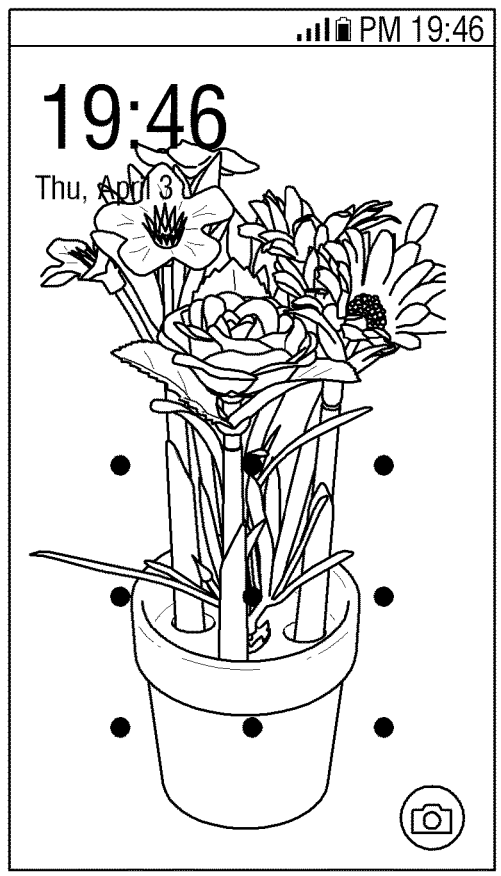
Figure 9:
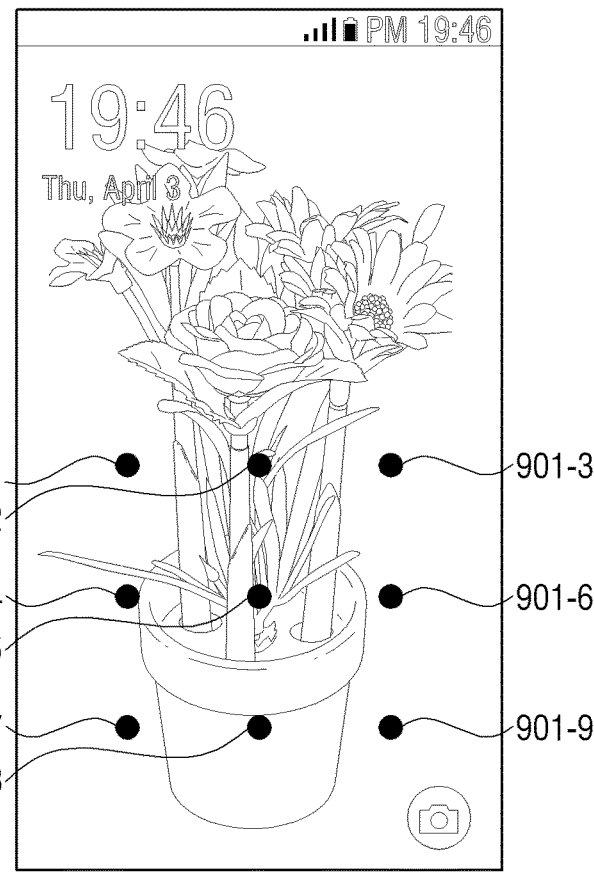

FIG. 9 is a view illustrating display regions of which the brightness is increased on the basis of surrounding brightness according to still another exemplary embodiment.

In FIG. 9, (a) shows a state where the whole display region is displayed with the first brightness. In this state, a lock screen for receiving an input of a pattern may be displayed on the display region.

In this situation, the sensor 180 may sense the surrounding brightness of the portable device 10.

Based on the sensed surrounding brightness, as shown as (b) of FIG. 9, the controller 190 may control the display 130 to display a plurality of pixels 901-1 to 901-9 corresponding to UI elements that are used to release the lock screen with the second brightness on the display region.

Next, the sensor 180 may receive a user's pattern input for touch and drag between the UI elements. In response to the user input, the controller 190 may control the display 130 to release the lock screen and to display a home screen.

Figure 10:
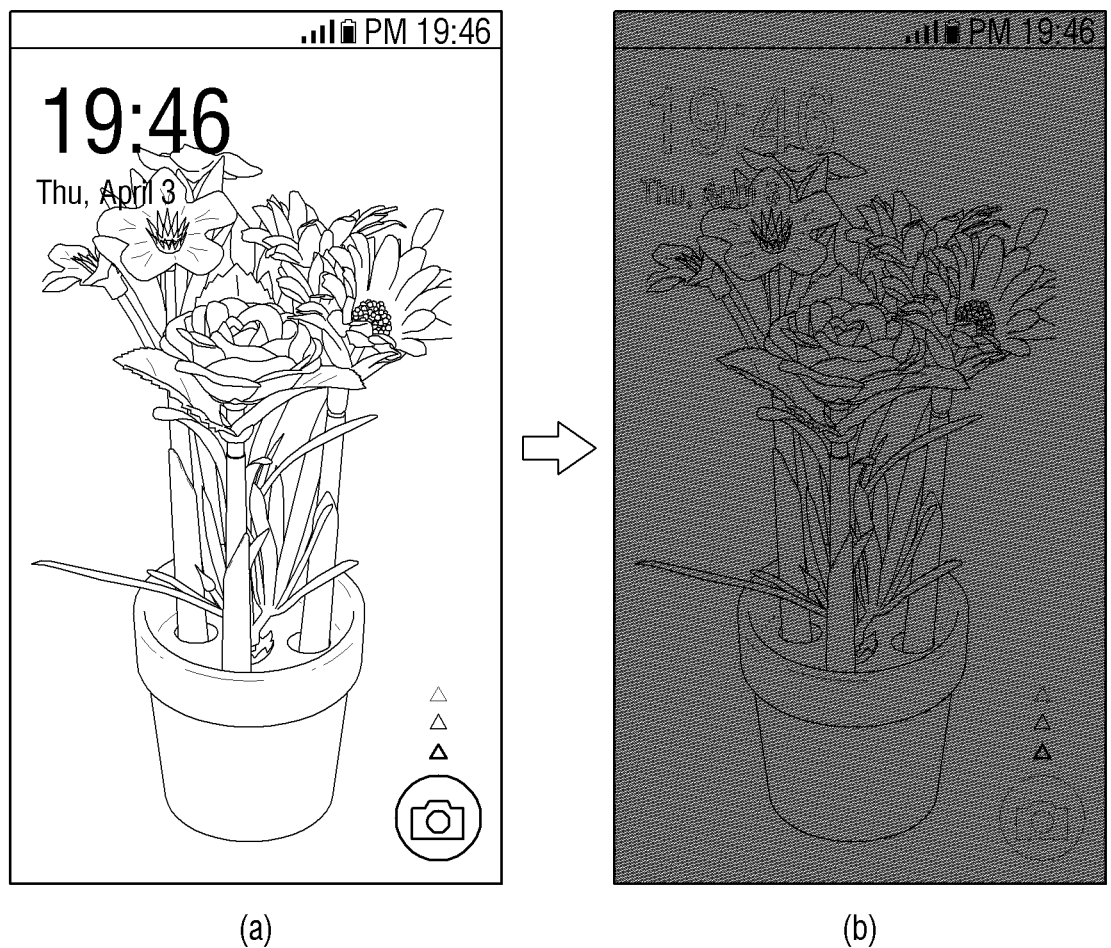
FIGS. 10 to 12 are views illustrating display regions of which a brightness is decreased on the basis of a surrounding brightness according to an exemplary embodiment.

FIG. 10 is a view illustrating display regions of which the brightness is decreased on the basis of surrounding brightness according to an exemplary embodiment.

In FIG. 10, (a) shows a state where the whole display region is displayed with the first brightness.

In this situation, the sensor 180 may sense the surrounding brightness of the portable device 10. For example, the sensor 180 may sense the surrounding brightness of the portable device 10 that is changed as a user moves from a bright place to a dark place. In this case, a third party who has previously stayed in the dark place may have an aversion to the abrupt brightness of the user's portable device 10.

Accordingly, based on the sensed surrounding brightness, as shown as (b) of FIG. 10, the controller 190 may control the display 130 to display the whole display region with the second brightness that is lower than the first brightness. In this case, the luminance value corresponding to the second brightness may be lower than the luminance value corresponding to the first brightness.

Specifically, if the illuminance value that represents the surrounding brightness is in the range of a plurality of levels, that is, in the range of level 1 to level 10, the controller 190 may determine that the illuminance value is, for example, less than or equal to level 3.

Here, the luminance value corresponding to the second brightness may be greater than the luminance value corresponding to the first brightness. For example, if the luminance value corresponding to the first brightness is a value from about 100 lux to about 150 lux, the luminance value corresponding to the second brightness may be a value from about 10 lux to about 50 lux. Further, if the luminance value corresponding to the first brightness is a value from about 150 lux to about 200 lux, the luminance value corresponding to the second brightness may be a value from about 50 lux to about 100 lux. Further, if the luminance value corresponding to the first brightness is a value from about 300 lux to about 400 lux, the luminance value corresponding to the second brightness may be a value from about 100 lux to about 200 lux. On the other hand, the luminance value corresponding to the first brightness and the luminance value corresponding to the second brightness are not limited to the above-described examples, but may be various numerical values set by a manufacturer of the portable device 10, a provider of an application installed in the portable device 10, or a provider of the operating system. The values may also be set experimentally according to a use of the device, or may be set by the user, for example, using a setting screen.

Further, the luminance value corresponding to the second brightness may relatively differ in accordance with the illuminance value of the surrounding brightness. For example, as the change of the illuminance value of the surrounding brightness becomes greater, the luminance value corresponding to the second brightness may become lower.

Further, the portable device 10 may operate in an auto brightness mode in which the brightness of the display region is automatically changed in accordance with the surrounding brightness. In this case, the portable device 10 may determine that the luminance value corresponding to the second brightness is less than the luminance value determined in accordance with the auto brightness mode.

Figure 11:
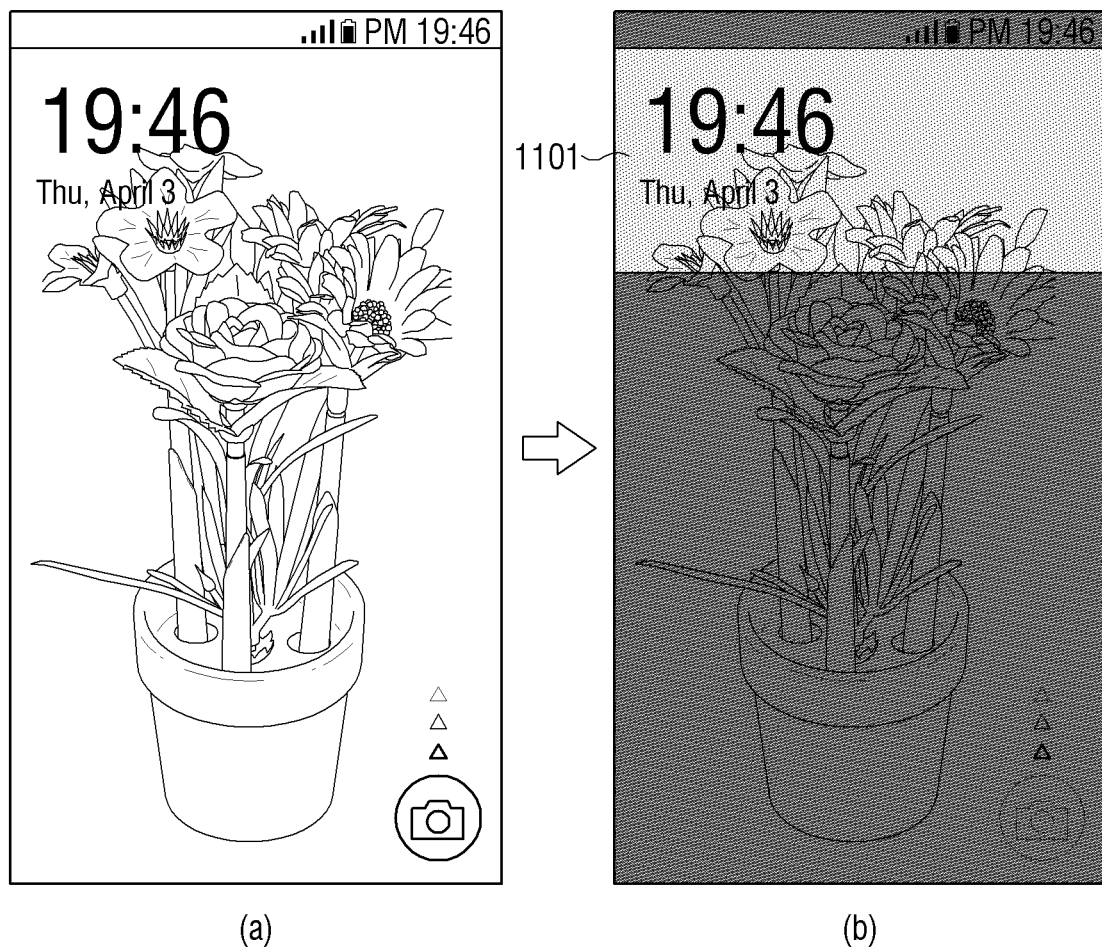

FIG. 11 is a view illustrating display regions of which the brightness is decreased on the basis of surrounding brightness according to an embodiment of the present disclosure.

In FIG. 11, (a) shows a state where the whole display region is displayed with the first brightness.

In this situation, the sensor 180 may sense the surrounding brightness of the portable device 10. For example, the sensor 180 may sense the surrounding brightness of the portable device 10 that is changed as a user moves from a bright place to a dark place.

Based on the sensed surrounding brightness, as shown as (b) of FIG. 11, the controller 190 may control the display 130 to display a partial region 1101 of the display region with the second brightness and to display another partial region thereof with a third brightness.

In this case, the luminance value of the second brightness and the luminance value of the third brightness may be lower than the luminance value of the first brightness. In this case, the partial region 1101 may be a region that corresponds to a UI element or notification information (e.g., time information, weather information, message information, SNS information, alarm information, or phone reception information). In this case, the controller 190 may control the display 130 to display the region that corresponds to the UI element or notification information with a brightness that is greater than the brightness of other regions. That is, in order for a user to easily recognize the UI element or notification information, the partial region 1101 corresponding to the UI element or the notification information may be displayed with the brightness that is greater than the brightness of other display regions.

Figure 12:
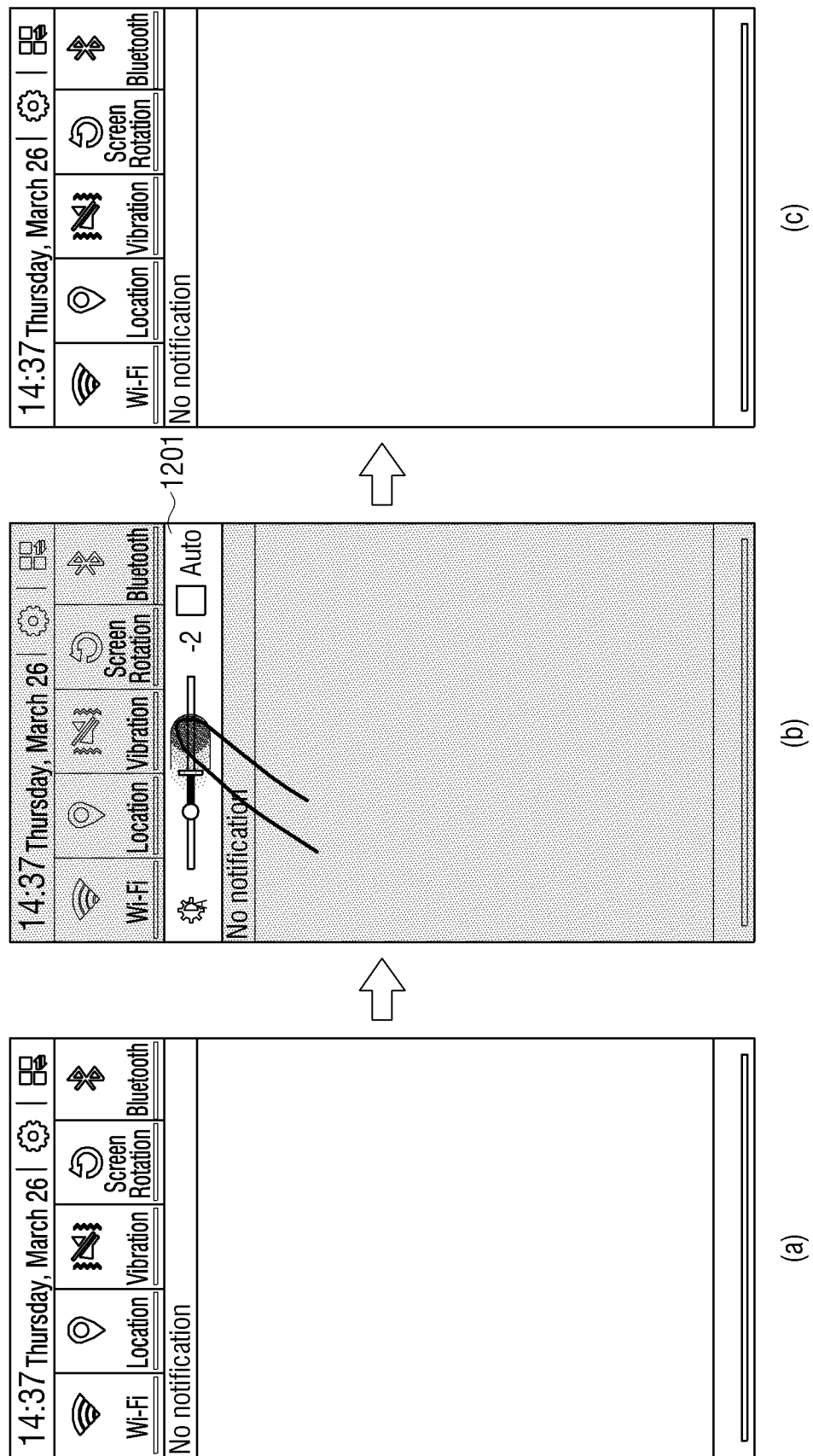

FIG. 12 is a view illustrating display regions of which the brightness is decreased on the basis of surrounding brightness according to an exemplary embodiment.

In FIG. 12, (a) shows a state where the whole display region is displayed with the first brightness.

In this situation, the sensor 180 may sense the surrounding brightness of the portable device 10. For example, the sensor 180 may sense the surrounding brightness of the portable device 10 that is changed as a user moves from a bright place to a dark place.

Based on the sensed surrounding brightness, as shown as (b) of FIG. 12, the controller 190 may control the display 130 to display the whole display region with the second brightness that is lower than the first brightness.

In this case, the controller 190 may control the display 130 to newly display a brightness control UI element on the display region and to display a region 1201 corresponding to the brightness control UI element with the third brightness. In this case, the luminance value of the third brightness may be greater than the luminance value of the first brightness.

Next, the sensor 180 may receive a user input for controlling the brightness of the display region through the brightness control UI element. The user input may be, for example, a touch input that touches and drags an adjuster of the brightness control UI element.

In response to the user input, as shown as (c) of FIG. 12, the controller 190 may control the display 130 to display the display region with fourth brightness. In this case, since the user's touch drag is released, the controller 190 may control the display 130 to make the brightness control UI element automatically disappear.

Figure 13A:
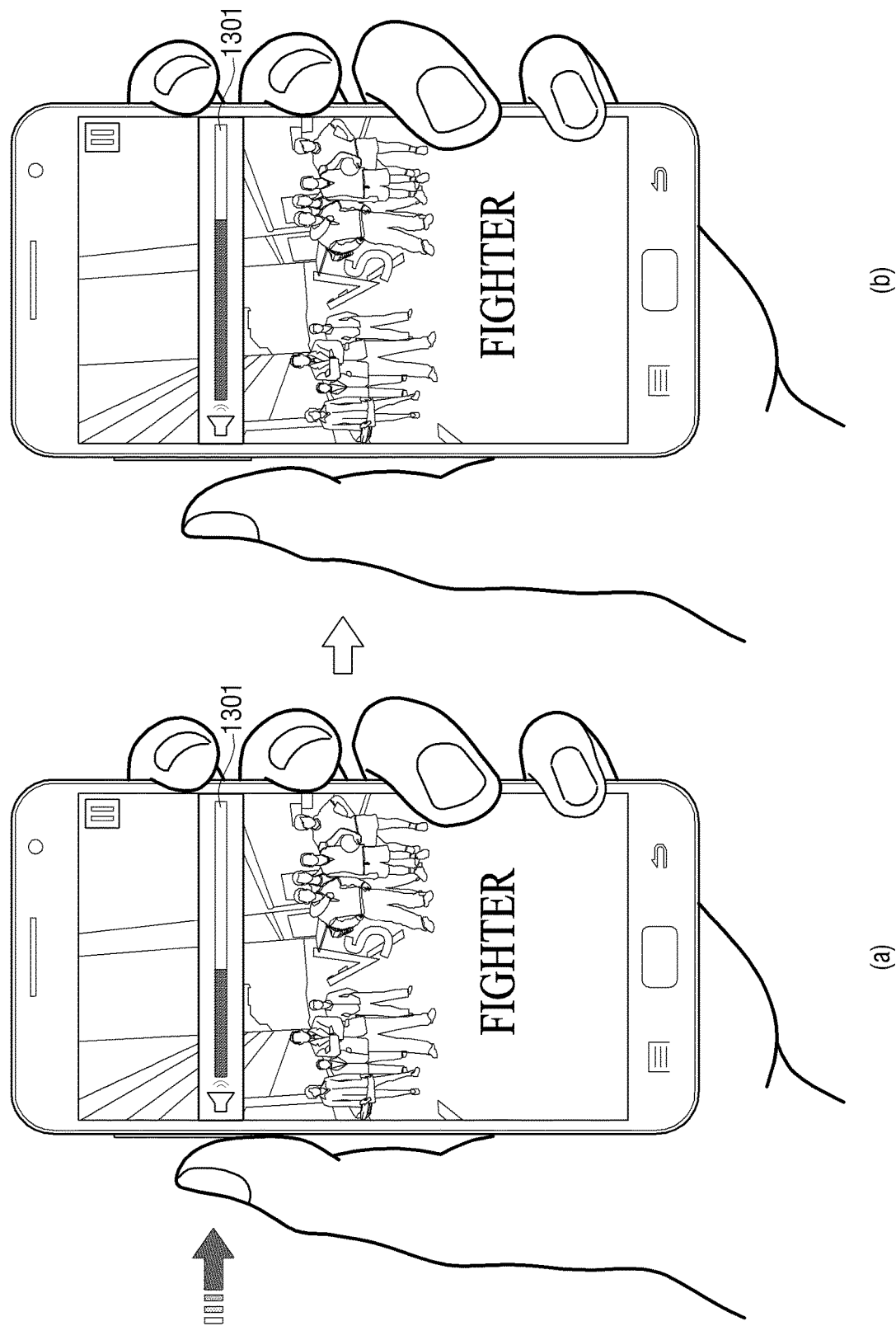
FIGS. 13A and 13B are views illustrating that different UI elements are displayed with respect to the same user input in accordance with applications being executed, according to an exemplary embodiment.
Figure 13B:
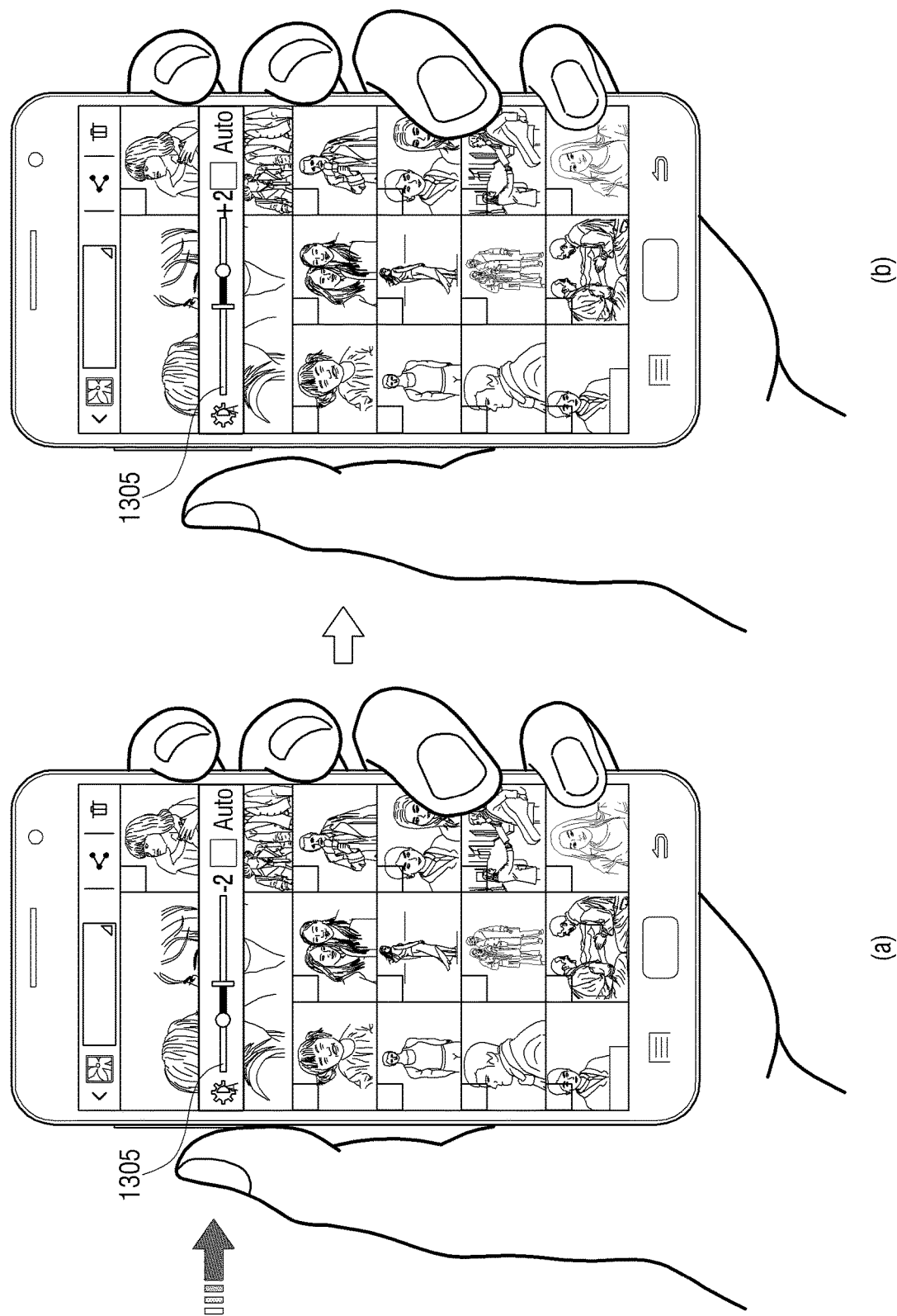

FIGS. 13A and 13B are views illustrating that different UI elements are displayed with respect to the same user input in accordance with applications being executed according to an exemplary embodiment.

As one exemplary embodiment, as shown as (a) of FIG. 13A, the controller 190 may control the display 130 to display an execution screen of a first application (e.g., game application, music player, radio application, or phone application, etc.) that provides sound with a first level value. If a user input to press a button on one side of the portable device 10 is sensed, the controller 190 may control the display 130 to display a volume control UI element 1301. Next, the touch sensor 181 may receive a user input for controlling the sound of the first application. The user input may be, for example, a user input to continuously press the button on one side of the portable device 10.

In response to the user input, as shown as (b) of FIG. 13A, the controller 190 may control the audio outputter 170 to change the sound of the first application from the first level value to a second level value.

As another exemplary embodiment, as shown as (a) of FIG. 13B, the controller 190 may control the display 130 to display an execution screen of a first application (e.g., gallery application, memo application, or text message application, etc.) that does not provide sound. If a user input to press a button on one side of the portable device 10 is sensed, the controller 190 may control the display 130 to display a brightness control UI element 1301. Next, the touch sensor 181 may receive a user input for controlling the brightness of the display region. The user input may be, for example, a user input to continuously press the button on one side of the portable device 10.

In response to the user input, as shown as (b) of FIG. 13B, the controller 190 may control the display 130 to change the brightness of the display region from the first brightness to the second brightness.

As described above, the controller 190 may control the display 130 to display the UI element that performs different functions with respect to the same user input in accordance with the kind of the application being provided. For this, if the user input is received from the sensor 180, the controller 190 may determine the kind of the application that is currently displayed. Then, the controller 190 may control the display 130 to differently display the UI element to control the application in accordance with the kind of the application.

Further, UI elements corresponding to applications may be set according to the kinds of the applications. In this case, if the user input is received from the sensor 180, the controller 190 may control the display 130 to display the UI element to control the currently displayed application.

Figure 14:
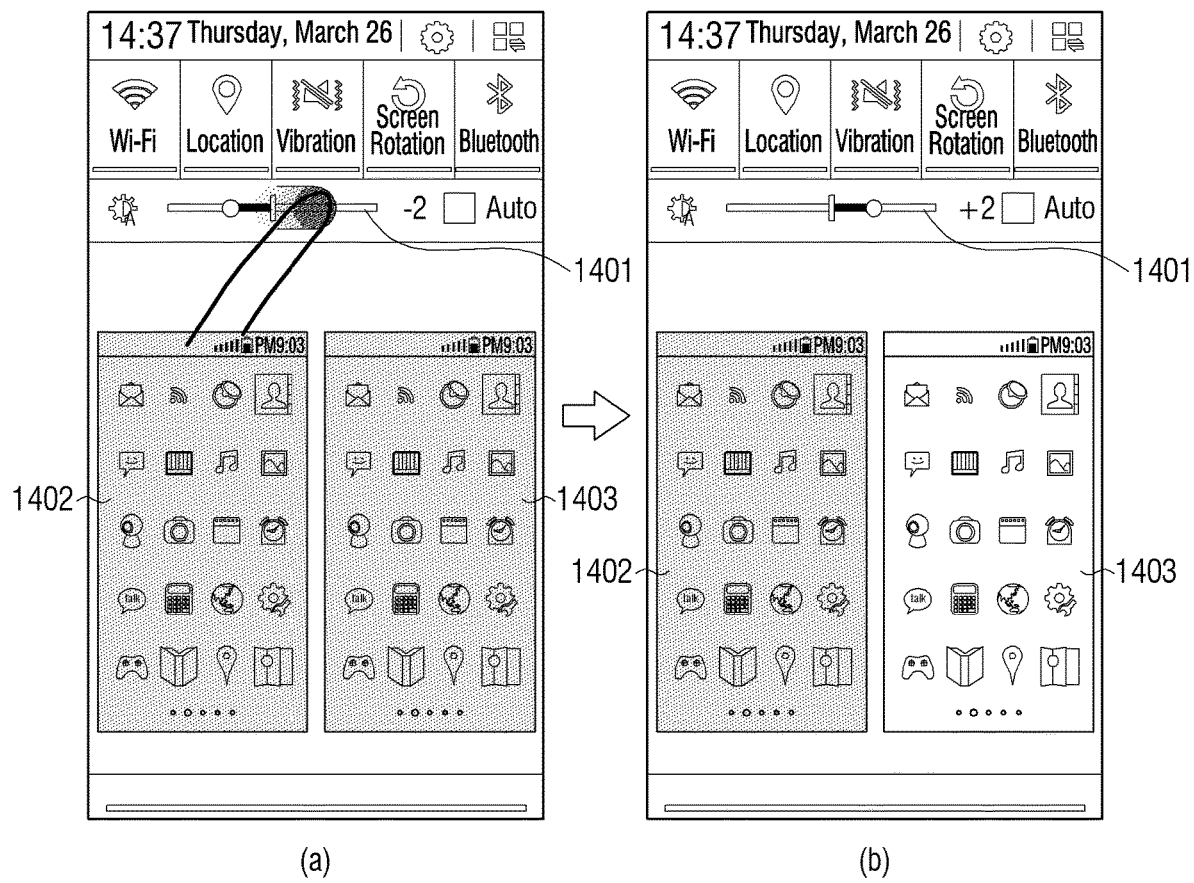
FIG. 14 is a view illustrating a screen for controlling brightness according to an exemplary embodiment.

FIG. 14 is a view illustrating a screen for controlling brightness according to an exemplary embodiment.

Referring to (a) of FIG. 14, the controller 190 may control the display 130 to display a screen that includes a brightness control UI element 1401.

For example, as described above, the controller 190 may control the display 130 to display a brightness control UI element 1401 based on the surrounding brightness. Further, the controller 190 may control the display 130 to display the brightness control UI element 1401 in response to a user input for selecting a button on one side of the portable device 10. Further, the controller 190 may control the display 130 to display the brightness control UI element 1401 in response to a user input for calling a quick panel.

In this case, the controller 190 may control the display 130 to display a first screen 1402 (e.g., home screen) being displayed with the first brightness before or just before the user input for displaying the brightness control UI element 1401 is received.

Further, the controller 190 may control the display 130 to display a second screen 1403 to be displayed with the second brightness in accordance with a user input through the brightness control UI element.

In this case, the first screen 1402 may be a screen that includes the same contents with the same brightness as that of the second screen 1403. Further, the first screen 1402 and the second screen 1403 may be thumbnail images. Next, the sensor 180 may sense a user input for controlling the brightness of the screen through the brightness control UI element 1401.

In response to the user input, as shown as (b) of FIG. 14, the controller 190 may control the display 130 to display the second screen 1403 with the second brightness while maintaining the first screen 1402 with the first brightness.

In this case, the user can control the brightness of the display region as comparing the brightness of the first screen 1402 previously operated by the user with the brightness of the second screen 1403, and thus user's visibility and convenience can be improved.

Figure 15:
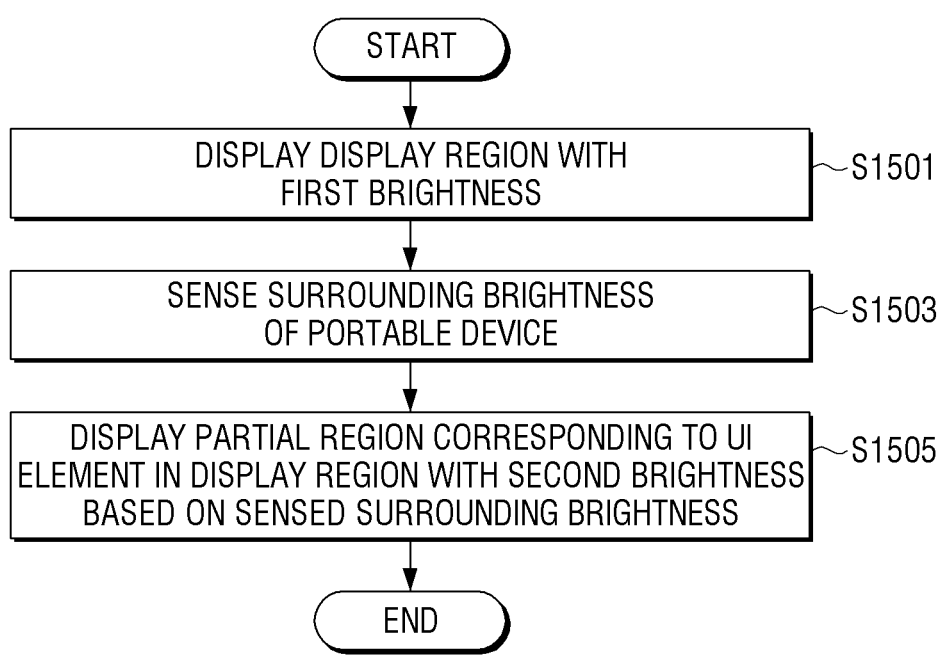
FIGS. 15 and 16 are flowcharts illustrating a method for controlling brightness according to an exemplary embodiment.

FIG. 15 is a flowchart illustrating a method for controlling brightness according to an exemplary embodiment.

At S1501, a portable device 10 may display a display region with first brightness.

At S1503, the portable device 10 may sense surrounding brightness of the portable device 10.

At S1505, the portable device 10 may display a partial region corresponding to a UI element in the display region with second brightness based on the sensed surrounding brightness. Further, the portable device 10 may display a region excluding the partial region of the display region continuously with the first brightness or with a brightness that is lower than the first brightness.

Figure 16:
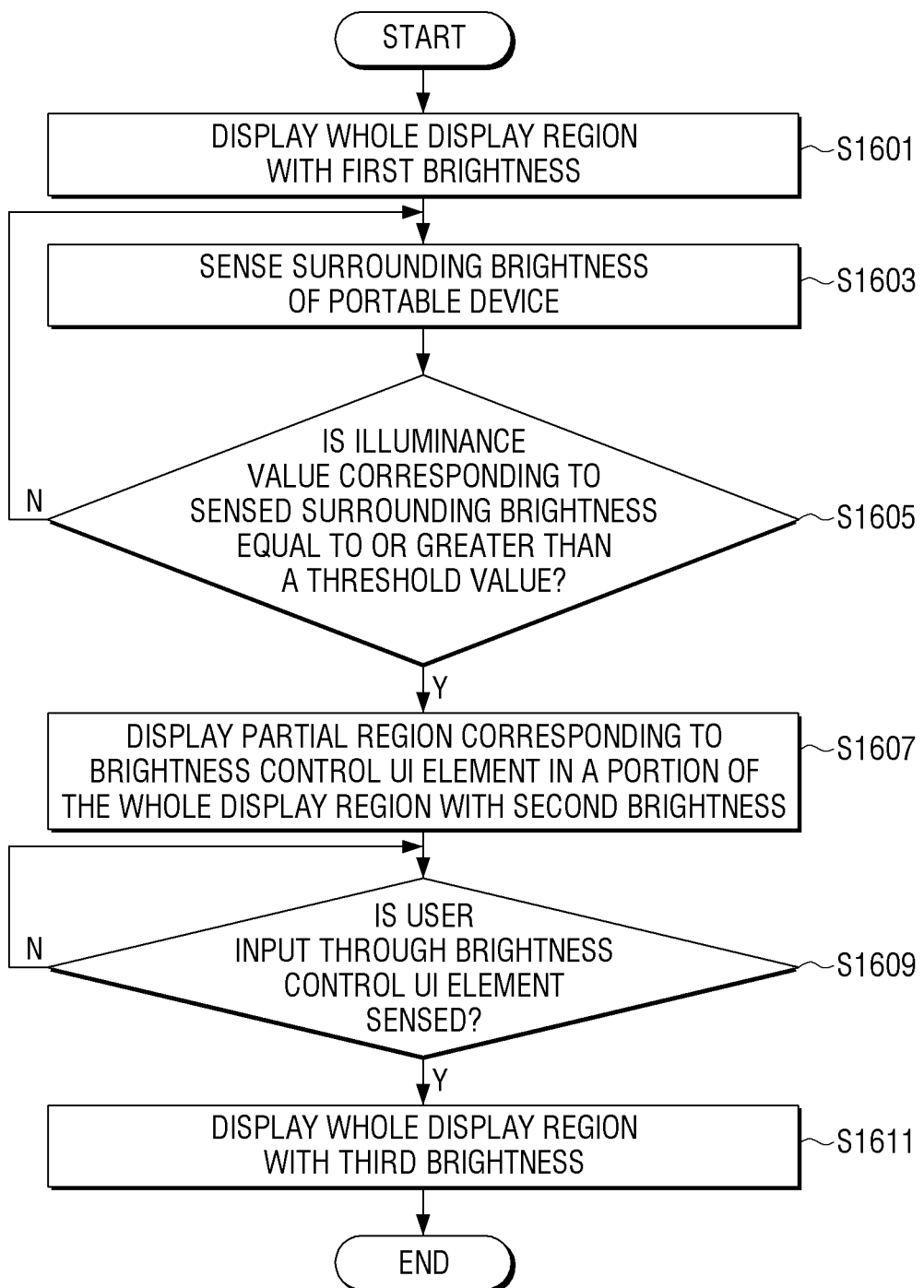

FIG. 16 is a flowchart illustrating a method for controlling brightness according to an exemplary embodiment.

At S1601, the portable device 10 may display the whole display region with first brightness.

At S1603, the portable device 10 may sense the surrounding brightness of the portable device 10.

At S1605, the portable device 10 may determine whether the illuminance value corresponding to the surrounding brightness is equal to or greater than a threshold value.

At S1607, if it is determined that the illuminance value is equal to or greater than the threshold value (S1605-Y), the portable device 10 may display the partial region corresponding to the brightness control UI element in a portion of the whole display region with the second brightness. In this case, the second brightness may be greater than the first brightness. That is, the luminance value corresponding to the second brightness may be greater than the luminance value corresponding to the first brightness. In contrast, if it is determined that the illuminance value is smaller than the threshold value (S1605-N), the portable device 10 may continuously sense the surrounding brightness of the portable device 10.

At S1609, the portable device 10 may determine whether a user input through the brightness control UI element is sensed.

At S1611, if the user input is sensed (S1609-Y), the portable device may display the whole display region with a third brightness. In this case, the third brightness may be greater than the first brightness. That is, the luminance value corresponding to the third brightness may be greater than the luminance value corresponding to the first brightness.

The device (e.g., modules or portable device 10) or the method (e.g., operations) according to various exemplary embodiments may be performed by at least one computer (e.g., processor 190) that executes instructions included in at least one of programs that are maintained in, for example, a computer-readable storage medium.

In the case where the instructions are executed by the computer (e.g., processor 190), the at least one computer may perform functions corresponding to the instructions. In this case, the computer-readable storage medium may be, for example, the above-described memory 150.

Programs may be included in a computer-readable storage medium, such as a hard disc, a floppy disc, a magnetic medium (e.g., magnetic tape), an optical medium (e.g., Compact Disc Read Only Memory (CD-ROM)), a Digital Versatile Disc (DVD), a magneto-optical medium (e.g., floptical disk), or a hardware device (e.g., Read Only Memory (ROM), Random Access Memory (RAM), or flash memory). In this case the storage medium is generally included as a part of the configuration of the portable device 10. However, the storage medium may be mounted through a port of the portable device, or may be included in an external device (e.g., cloud, server, or other electronic devices) located out of the portable device 10. Further, the programs may be dividedly stored in a plurality of storage media, and in this case, at least a part of the plurality of storage media may be located in the external device of the portable device 10.

The instructions may include not only machine codes that are made by a compiler but also high-class language codes that can be executed by a computer using an interpreter. The above-described hardware device may be configured to operate as one or more software modules and vice versa, in order to perform the operations according to various exemplary embodiments.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A portable device comprising:
a display;
a sensor; and
a controller configured to:
control the display to display an image with a first brightness on the display without displaying a User Interaction (UI) element for controlling a brightness of the image,
based on a surrounding brightness sensed through the sensor being higher than a first threshold brightness during the UI element for controlling the brightness of the image being not displayed on the display, control the display to display, on a partial region of the display, the UI element for controlling the brightness of the image and control the display to display the image with a second brightness greater than the first brightness, wherein the brightness of the image is changed to the second brightness based on a user input on the UI element displayed on the partial region of the display, and
based on the surrounding brightness sensed through the sensor being lower than a second threshold brightness which is lower than the first threshold brightness, control the display to display the image with a third brightness lower than the first brightness.

2. The portable device as claimed in claim 1, wherein, when the controller controls the display to display the UI element on the partial region, the controller controls the display to display a region excluding the partial region of the display continuously with the first brightness, or with a fourth brightness that is lower than the second brightness.

3. The portable device as claimed in claim 1, wherein the controller controls the display to display the UI element on the partial region with the second brightness if an illuminance value corresponding to the sensed surrounding brightness is equal to or greater than a threshold value, or a changed value of the illuminance value is equal to or greater than a threshold value.

4. The portable device as claimed in claim 1, wherein the partial region corresponding to the UI element corresponds to a layout region including the UI element, a field region including the UI element, or a plurality of pixels displaying the UI element.

5. The portable device as claimed in claim 1, wherein the UI element comprises a UI element for controlling the brightness of the image.

6. The portable device as claimed in claim 5, wherein the sensor senses a user input for controlling the brightness of the image through the UI element, and
the controller controls the display to display the image with a brightness corresponding to the user input.

7. The portable device as claimed in claim 1, wherein in the case where content is displayed on the display, the UI element comprises a UI element for controlling the content.

8. The portable device as claimed in claim 1, wherein in the case where a lock screen is displayed on the display, the UI element comprises at least one UI element for releasing the lock screen.

9. The portable device as claimed in claim 1, wherein the controller identifies the partial region corresponding to the UI element in the display.

10. The portable device as claimed in claim 1, wherein the controller is configured to, based on the surrounding brightness sensed through the sensor being lower than the second threshold brightness while the image is displayed on the display, control the display to display the image with the third brightness lower than the first brightness.

11. A method for controlling brightness of a portable device, comprising:
displaying an image with a first brightness on a display of the portable device without displaying a User Interaction (UI) element for controlling a brightness of the image;
sensing a surrounding brightness of the portable device;
based on the surrounding brightness being higher than a first threshold brightness, displaying, on a partial region of the display during the UI element for controlling the brightness of the image being not displayed on the display, the UI element for controlling the brightness of the image and displaying the image with a second brightness greater than the first brightness, wherein the brightness of the image is changed to the second brightness based on a user input on the UI element displayed on the partial region of the display; and based on the surrounding brightness being lower than a second threshold brightness which is lower than the first threshold brightness, displaying the image with a third brightness lower than the first brightness.

12. The method as claimed in claim 11, wherein the displaying the UI element comprises displaying a region excluding the partial region of the display continuously with the first brightness, or with a fourth brightness that is lower than the second brightness.

13. The method as claimed in claim 11, wherein the displaying the UI element comprises displaying the UI element on the partial region with the second brightness if an illuminance value corresponding to the surrounding brightness is equal to or greater than a threshold value, or a changed value of the illuminance value is equal to or greater than a threshold value.

14. The method as claimed in claim 11, wherein the partial region corresponding to the UI element corresponds to a layout region including the UI element, a field region including the UI element, or a plurality of pixels displaying the UI element.

15. The method as claimed in claim 11, wherein the UI element comprises a UI element for controlling the brightness of the image.

16. The method as claimed in claim 15, further comprising:
sensing a user input for controlling the brightness of the image through the UI element; and
displaying the image with a brightness corresponding to the user input.

17. The method as claimed in claim 11, wherein in the case where content is displayed on the display, the UI element comprises a UI element for controlling the content.

18. The method as claimed in claim 11, wherein in the case where a lock screen is displayed on the display, the UI element comprises at least one UI element for releasing the lock screen.

19. The method as claimed in claim 11, wherein the displaying the UI element comprises identifying the partial region corresponding to the UI element in the display region, and displaying the partial region corresponding to the UI element with the second brightness.

20. A non-transitory recording medium recorded with a program for controlling brightness of a portable device that performs:
displaying an image with a first brightness on a display of the portable device without displaying a User Interaction (UI) element for controlling a brightness of the image;
sensing a surrounding brightness of the portable device;
based on the surrounding brightness being higher than a first threshold brightness, displaying, on a partial region of the display during the UI element for controlling the brightness of the image being not displayed on the display, the UI element for controlling the brightness of the image and displaying the image with a second brightness greater than the first brightness, wherein the brightness of the image is changed to the second brightness based on a user input on the UI element displayed on the partial region of the display;
based on the surrounding brightness being lower than a second threshold brightness which is lower than the first threshold brightness, displaying the image with a third brightness lower than the first brightness.

* * * * *